US011962072B2

(12) United States Patent
Brobston et al.

(10) Patent No.: US 11,962,072 B2
(45) Date of Patent: Apr. 16, 2024

(54) PHASED ARRAY ANTENNAS HAVING SWITCHED ELEVATION BEAMWIDTHS AND RELATED METHODS

(71) Applicant: CommScope Technologies LLC, Hickory, NC (US)

(72) Inventors: Michael Brobston, Allen, TX (US); Jonathon C. Veihl, New Lenox, IL (US)

(73) Assignee: CommScope Technologies LLC, Claremont, NC (US)

(*) Notice: Subject to any disclaimer, the term of this patent is extended or adjusted under 35 U.S.C. 154(b) by 587 days.

(21) Appl. No.: 17/108,147

(22) Filed: Dec. 1, 2020

(65) Prior Publication Data

US 2021/0083369 A1 Mar. 18, 2021

Related U.S. Application Data

(62) Division of application No. 15/968,813, filed on May 2, 2018, now Pat. No. 10,916,835.

(Continued)

(51) Int. Cl.

*H01Q 21/22* (2006.01)
*H01Q 1/24* (2006.01)

(Continued)

(52) U.S. Cl.

CPC ............... *H01Q 1/246* (2013.01); *H01Q 3/24* (2013.01); *H01Q 3/26* (2013.01); *H01Q 3/38* (2013.01); *H01Q 21/00* (2013.01); *H01Q 21/065* (2013.01); *H01Q 21/08* (2013.01); *H01Q 21/22* (2013.01)

(58) Field of Classification Search

CPC ............ H01Q 1/246; H01Q 3/24; H01Q 3/26; H01Q 3/38; H01Q 21/00; H01Q 21/065; H01Q 21/08; H01Q 21/22

See application file for complete search history.

(56) References Cited

U.S. PATENT DOCUMENTS 5,977,904 A * 11/1999 Mizuno ................ H01Q 1/3233 342/70
6,606,059 B1 8/2003 Barabash (Continued)

FOREIGN PATENT DOCUMENTS

CN 1503587 A 6/2004
CN 1661857 A 8/2005

(Continued)

OTHER PUBLICATIONS

"Translation of Japanese Office Action, for corresponding Japanese Application No. 2019-564040, dated Dec. 21, 2021".

(Continued)

*Primary Examiner* — Graham P Smith
(74) *Attorney, Agent, or Firm* — Myers Bigel, P.A.

(57) ABSTRACT

A phased array antenna includes a first transceiver, a plurality of first radiating elements that are arranged in a first linear array, a first feed network electrically interposed between the first radiating elements and the first transceiver, and a first switch that is coupled along the first feed network, where a state of the first switch is selectable to adjust a number of the first radiating elements that are electrically connected to the first transceiver.

11 Claims, 15 Drawing Sheets

Related U.S. Application Data

(60) Provisional application No. 62/522,859, filed on Jun. 21, 2017, provisional application No. 62/506,100, filed on May 15, 2017.

(51) Int. Cl.

| | |
|---|---|
| ***H01Q 3/24*** | (2006.01) |
| ***H01Q 3/26*** | (2006.01) |
| ***H01Q 3/38*** | (2006.01) |
| ***H01Q 21/00*** | (2006.01) |
| ***H01Q 21/06*** | (2006.01) |
| ***H01Q 21/08*** | (2006.01) |

(56) References Cited

U.S. PATENT DOCUMENTS

| | | | |
|---|---|---|---|
| 6,895,253 | B1 | 5/2005 | Carloni et al. |
| 7,292,198 | B2 | 11/2007 | Shtrom et al. |
| 2004/0204109 | A1 | 10/2004 | Hoppenstein |
| 2014/0210666 | A1 | 7/2014 | Maltsev et al. |
| 2014/0355702 | A1 | 12/2014 | Thomas et al. |
| 2016/0183275 | A1 | 6/2016 | Inoue et al. |

FOREIGN PATENT DOCUMENTS

| | | | |
|---|---|---|---|
| CN | 102646874 | A | 8/2012 |
| JP | 10-268029 | A | 9/1998 |
| JP | 2003229713 | A | 8/2003 |
| JP | 2011087003 | A | 4/2011 |
| TW | 201433005 | A | 8/2014 |

OTHER PUBLICATIONS

European Extended Search Report, corresponding to European Patent Application No. 18801813.9, dated Nov. 27, 2020, 8 pages.

"European Examination Report in Corresponding Patent Application No. 18801813.9, dated Mar. 13, 2023, 6 pages".

English translation of Notification of the First Office Action corresponding to Chinese Patent Application No. 201880032369.7 (20 pages) (dated Aug. 27, 2020).

"Notification of Transmittal of the International Search Report and the Written Opinion of the International Searching Authority, or the Declaration corresponding to International Application No. PCT/US2018/030572, dated Aug. 24, 2018, 12 pages".

"Translation of Chinese Board Opinion—Chinese Application No. 201880032369.7—dated Jun. 24, 2022".

"English translation of Notification of the Third Office Action corresponding to Chinese Patent Application No. 201880032369.7 (8 pages) (dated Jun. 2, 2021)".

* cited by examiner

PHASED ARRAY ANTENNAS HAVING SWITCHED ELEVATION BEAMWIDTHS AND RELATED METHODS

CROSS-REFERENCE TO RELATED APPLICATIONS

The present application claims priority under 35 U.S.C. § 120 as a divisional of U.S. patent application Ser. No. 15/968,813, filed May 2, 2018, which in turn claims priority under 35 U.S.C. § 119 to U.S. Provisional Patent Application Ser. No. 62/506,100, filed May 15, 2017, and to U.S. Provisional Patent Application Ser. No. 62/522,859, filed Jun. 21, 2017, the entire content of each of which is incorporated by reference as if set forth fully herein.

BACKGROUND

The present invention generally relates to radio communications and, more particularly, to phased array antennas for wireless communications systems.

Cellular communications systems are well known in the art. In a cellular communications system, a geographic area is divided into a series of regions that are referred to as "cells" which are served by respective base stations. The base station may include one or more base station antennas that are configured to provide two-way radio frequency ("RF") communications with mobile subscribers (also referred to as "users" herein) that are within the cell served by the base station. Conventionally, base stations were often divided into "sectors" and each sector was served by one or more base station antennas that generated radiation patterns or "antenna beams" that were sized to provide service throughout the sector. Eacg base station antenna typically included one or more vertically-disposed columns of radiating elements, where each column of radiating elements formed a respective antenna beam. Each radiating element may be designed to have a desired half-power beamwidth in the azimuth plane (i.e., a plane that is parallel to the plane defined by the horizon when the base station antenna is mounted for use) so that the antenna beam generated by the column of radiating elements will cover the full sector. A column of radiating elements is typically provided in order to shrink the beamwidth of the antenna beam in the elevation plane in order to increase the antenna gain throughout the sector and to reduce interference with neighboring cells For many fifth generation (5G) cellular communications systems, full two dimensional beam-steering is being considered. These 5G cellular communications systems are time division multiplexed systems where different users or sets of users may be served during different time slots. For example, each 10 millisecond period (or some other small period of time) may represent a "frame" that is further divided into dozens or hundreds of individual time slots. Each user may be assigned one or more of the time slots and the base station may be configured to communicate with the different users during their individual time slots of each frame. With full two dimensional beam-steering, the base station antenna may generate small, highly-focused antenna beams on a time slot-by-time slot basis. These highly-focused antenna beams are often referred to as "pencil beams," and the base station antenna adapts or "steers" the pencil beam so that it points at different users during each respective time slot. Pencil beams may have very high gains and reduced interference with neighboring cells, so they may provide significantly enhanced performance.

In order to generate pencil beams that are narrowed in both the azimuth and elevation planes, it is typically necessary to provide base station antennas having a two-dimensional array that includes multiple rows and columns of radiating elements with full phase distribution control. The base station antennas may be active antennas that have a separate transceiver (radio) for each radiating element in the planar array (or for individual sub-groups of radiating elements in some cases) to provide the full phase distribution control (i.e., the transceivers may act in coordinated fashion to transmit the same RF signal during any given time slot, with the amplitude and/or phase of the sub-components of the RF signal output by the different transceivers manipulated to generate the directional pencil beam radiation pattern). While this technique can provide very high throughput, the provision of planar array antennas and large numbers of individual transceivers may add a significant level of cost and complexity to the base station.

SUMMARY

Pursuant to embodiments of the present invention, methods of operating a phased array antenna that includes at least a first column of radiating elements are provided. Pursuant to these methods, a first RF signal may be transmitted to a first user through all of the radiating elements in the first column of radiating elements. A second RF signal may be transmitted to a second user through a first subset of the radiating elements in the first column of radiating elements, the first subset including less than all of the radiating elements in the first column of radiating elements. The first user may be at a first distance from the phased array antenna and the second user may be at a second distance from the phased array antenna that is less than the first distance.

In some embodiments, a switch may be provided along the first column of radiating elements that is configurable to selectively isolate a second subset of the radiating elements in the first column of radiating elements from a source of the first and second RF signals. The switch may comprise, for example, a PIN diode. The source of the first and second RF signals may be a transceiver that is coupled via a transmission line to the first subset of the radiating elements in the first column of radiating elements and that is selectively coupled to the second subset of the radiating elements in the first column of radiating elements through the switch. The switch may be located at an electrical distance of approximately $[0.25+(n*0.5)]\lambda$ from a junction where the radiating element in the first subset of radiating elements that is farthest from the transceiver connects to the transmission line, where n is an integer having a value of 0 or greater and $\lambda$ is a wavelength corresponding to a center frequency of the frequency band of operation of the phased array antenna.

In embodiments that include a switch, a control signal may be transmitted to the switch to change a state of the switch after transmitting the first RF signal to the first user through all of the radiating elements in the first column of radiating elements and before transmitting the second RF signal to the second user through the first subset of the radiating elements in the first column of radiating elements. The control signal may be a direct current control signal in some embodiments.

In some embodiments, a radiation pattern of the phased array antenna may have a first elevation beamwidth when the switch is in a first state and has a second, different elevation beamwidth when the switch is in a second state. The switch may be a first switch, and the phased array antenna may include a second switch that is provided along the first column of radiating elements. In such embodiments, the radiation pattern of the phased array antenna may have a third elevation beamwidth when the first switch is in the first state and the second switch is in a first state, where the third elevation beamwidth is different than both the first and second elevation beamwidths. In some embodiments, the first switch may be provided along the first column of radiating elements between a first pair of adjacent radiating elements in the first column of radiating elements, and the second switch may be provided along the first column of radiating elements between a second pair of adjacent radiating elements in the first column of radiating elements that includes at least one radiating element that is not part of the first pair of adjacent radiating elements. In other embodiments, both the first switch and the second may be provided along the first column of radiating elements between a first pair of adjacent radiating elements in the first column of radiating elements.

In some embodiments, the phased array antenna may further include a second column of radiating elements. In such embodiments, a third RF signal may be transmitted to the first user through all of the radiating elements in the second column of radiating elements, and a fourth RF signal may be transmitted to the second user through a first subset of the radiating elements in the second column of radiating elements, the first subset including less than all of the radiating elements in the second column of radiating elements. The first and third RF signals may be transmitted at the same time and the second and fourth RF signals may be transmitted at the same time. In such embodiments, a second switch is provided along the second column of radiating elements that is configurable to selectively isolate a second subset of the radiating elements in the second column of radiating elements from a source of the third and fourth RF signals.

Pursuant to further embodiments of the present invention, phased array antennas are provided that include a first transceiver, a plurality of first radiating elements, a first feed network electrically interposed between the first radiating elements and the first transceiver and a first switch that is coupled along the first feed network. A state of the first switch is selectable to adjust a number of the first radiating elements that are electrically connected to the first transceiver.

In some embodiments, the first radiating elements may be arranged in a first linear array, and a radiation pattern of the first linear array may have a first elevation beamwidth when the first switch is in a first state and a second, different, elevation beamwidth when the first switch is in a second state.

In some embodiments, the first switch may be a PIN diode that is coupled between a transmission line segment of the first feed network and a reference voltage. The PIN diode may be located at an electrical distance of approximately $[0.25+(n*0.5)]\lambda$ from a junction where one of the first radiating elements connects to the transmission line segment, where n is an integer having a value of 0 or greater and $\lambda$ is a wavelength corresponding to a center frequency of the frequency band of operation of the phased array antenna.

In some embodiments, the antenna may further include a switch control network that is configured to provide a control signal to the first switch. The control signal may be a direct current control signal.

In some embodiments, the antenna may further include a second switch that is coupled along the first feed network. The radiation pattern of the first column of radiating elements may have a third elevation beamwidth when the first switch is in the first state and the second switch is in a first state, the third elevation beamwidth being different than both the first and second elevation beamwidths. The first switch may be provided along the first linear array between a first pair of adjacent radiating elements, and the second switch may be provided along the first linear array between a second pair of adjacent radiating elements that includes at least one radiating element that is not part of the first pair of adjacent radiating elements. In other embodiments, both the first switch and the second may be provided along the first linear array between a first pair of adjacent radiating elements.

In some embodiments, the phased array antenna may further include a plurality of additional transceivers, a plurality of additional linear arrays of radiating elements, a plurality of additional feed networks electrically interposed between the additional linear arrays and respective ones of the additional transceivers and a plurality of additional switches that are coupled along the respective additional feed networks. In such embodiments, a state of each of the additional switches may be selectable to adjust a number of the radiating elements in the respective additional linear arrays that are electrically connected to respective ones of the additional transceivers.

Pursuant to still further embodiments of the present invention, methods of operating a phased array antenna having a plurality of radiating elements arranged in a two-dimensional array having a plurality of rows and a plurality of columns are provided in which an azimuth pointing direction of an antenna beam generated by the phased array antenna is selected on a time-slot-to-time slot basis by phase weighting the RF signals that are provided to the radiating elements in the respective columns by respective ones of a plurality of transceivers. An elevation beamwidth of the antenna beam is also selected on the time slot-to-time slot basis by using switches to select a number of radiating elements in each column that are electrically connected to the respective transceivers. The elevation pointing direction of the antenna beam may also be selected on a time slot-to-time slot basis.

Pursuant to yet additional embodiments of the present invention, phased array antennas are provided that include a first transceiver, a first plurality of radiating elements that are electrically connected to the first transceiver, and a second plurality of radiating elements that are configured to be selectively connected to the first transceiver. The phased array antenna has a first elevation beamwidth when the second plurality of radiating elements are connected to the first transceiver and has a second elevation beamwidth that is greater than the first elevation beamwidth when the second plurality of radiating elements are disconnected from the first transceiver.

DETAILED DESCRIPTION

Embodiments of the present invention are directed to phased array antennas that use elevation beamwidth adjustment to provide adaptive beam steering capabilities with significantly less complexity than a full two-dimensional beam steering adaptive antenna. In particular, the phased array antennas according to embodiments of the present invention may include one or more switches that are used to adjust the number of radiating elements in each column of the phased array antenna that are "active" (i.e., used to transmit and/or receive RF signals) during any given time slot. When all of the radiating elements are active, the phased array antenna may generate an antenna beam having a narrow elevation beamwidth. By switching some of the radiating elements in each column out of the array, the elevation beamwidth may be increased. The phased array antennas according to embodiments of the present invention may be used, for example, as base station antennas for 5G cellular communications systems.

As will be discussed in greater detail herein, adjusting the elevation beamwidth by switching radiating elements in and out of a phased array antenna may, in some circumstances, provide performance that may be nearly as good as the performance provided by a two-dimensional full beam steering adaptive antenna, while having far less complexity. For example, a two-dimensional full beam steering adaptive antenna that has eight row and columns of radiating elements will typically have sixty-four transceivers, namely one for each radiating element in the array. In contrast, a switched elevation beamwidth phased array antenna according to embodiments of the present invention that includes eight rows and columns of radiating elements may be implemented with only eight transceivers (one per column), reducing the number of transceivers required by 87.5%.

Figure 1:
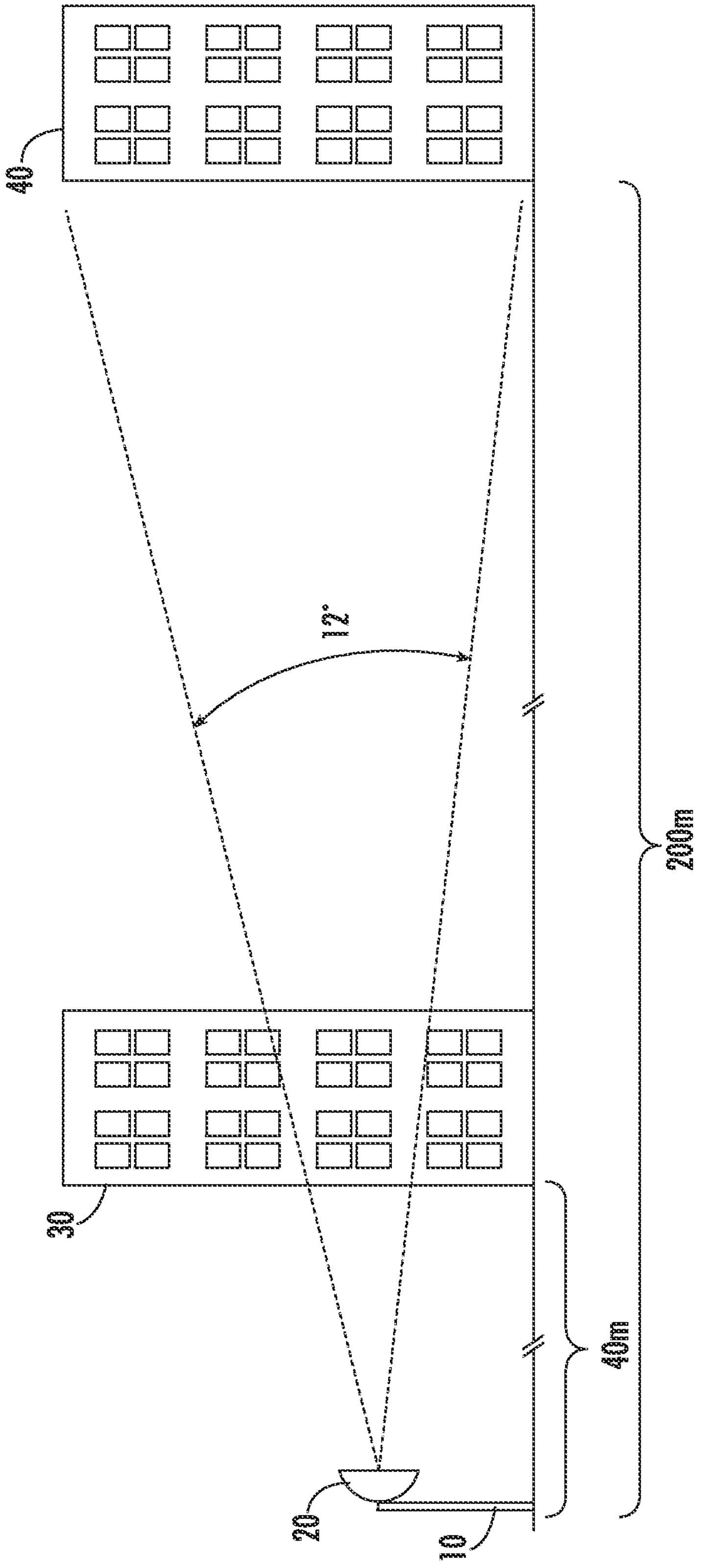
FIG. 1 is a schematic diagram that illustrates a reason why beam steering may be required in the elevation plane.

Adaptive antenna beam steering using narrow pencil beams may have a number of advantages, including (1) providing increased antenna gain, (2) lowering the amount of interference that the antenna generates in neighboring sectors or cells and (3) providing a capability to provide service to users at a wide range of distances and heights within the coverage area of the antenna. These capabilities are provided because the pencil beam can typically be "steered" by adjusting the amplitude and/or phase of the sub-components of an RF signal that are transmitted through the respective radiating elements so that a focused, high gain radiation pattern is formed that points in a desired direction. It may be more difficult to provide antenna patterns that provide adequate gain throughout a wide range of distances and heights using conventional antennas that do not have beam steering capabilities in the elevation plane. FIG. 1 is a schematic diagram that illustrates why such difficulties may arise.

As shown in FIG. 1, a base station antenna 20 may be mounted on a tower or other structure 10. Two example office buildings 30, 40 are shown in FIG. 1 that are within the sector of a cell served by base station antenna 20. The first office building 30 is located 40 meters from the base station antenna 20, while the second office building 40 is located 200 meters from the base station antenna 20. As illustrated in FIG. 1, an elevation beamwidth of 10°-12° provide coverage to (or "illuminate") users at a wide range of heights at a range of 200 meters or more without requiring elevation beam steering control. However, at closer ranges of, for example, less than 50 meters, the same elevation beamwidth would require elevation beam steering in order to illuminate users at the same range of heights. In particular, the antenna beam with the 12° elevation beamwidth that provides coverage to the entire building 40 at ranges of 200 meters or more would only provide coverage for a middle portion of the building 30.

Figure 2:
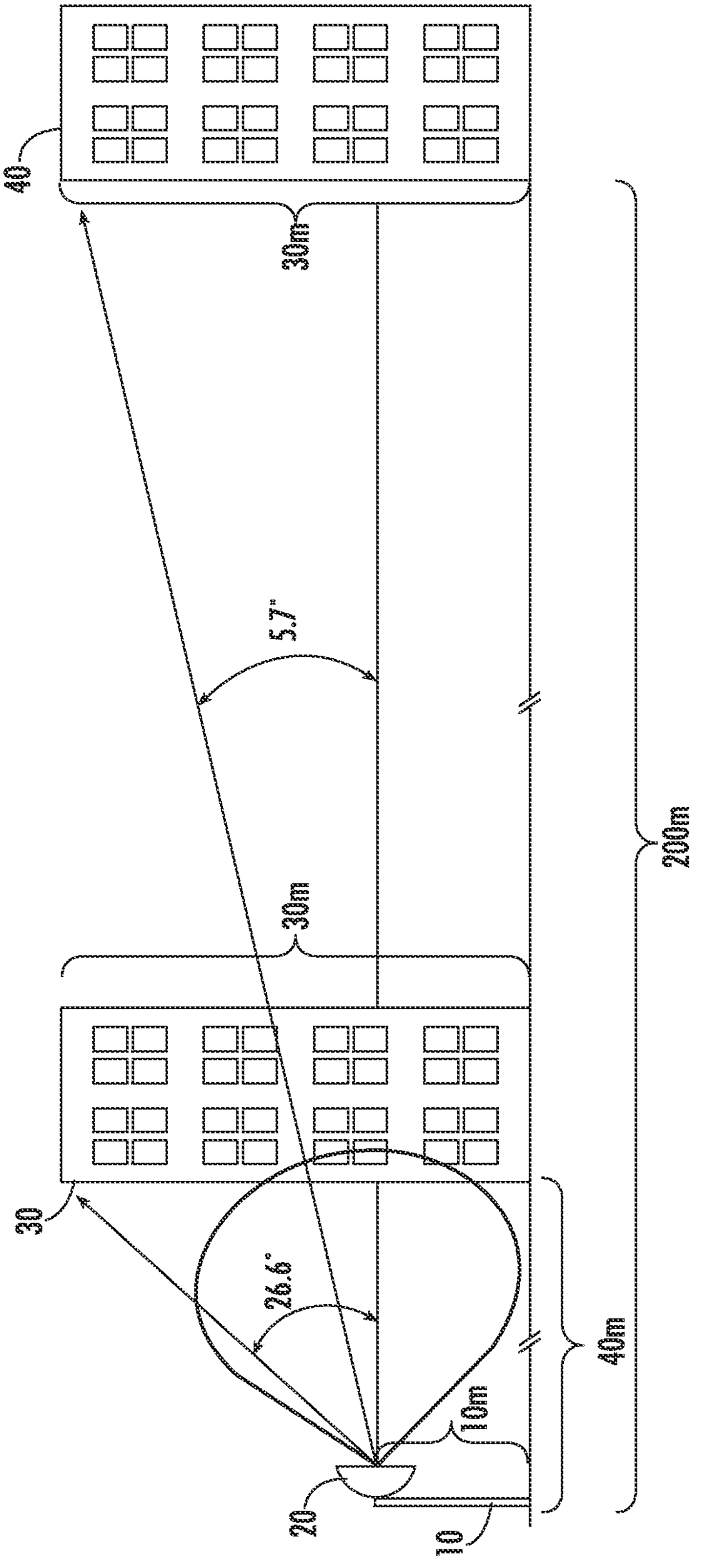
FIG. 2 is a schematic diagram that illustrates how the need for elevation beam steering may be eliminated by using an antenna having a wide elevation beamwidth.

To avoid the added cost and complexity of elevation beam steering, the base station antenna 20 could be designed to have a wide elevation beamwidth as shown in FIG. 2. An elevation beamwidth of about 53° could potentially provide the appropriate elevation coverage to nearby subscribers at the expected range of heights without utilizing elevation beam steering capability. The disadvantage of expanding the elevation beamwidth to provide coverage over the wide range of subscriber heights required at close range is that the antenna gain is significantly reduced as the elevation beamwidth is increased. This in turn reduces the effective isotropic radiated power (EIRP) toward users at far distances which thereby reduces the range capability for the wireless link or degrades performance to the distant users.

Figure 3:
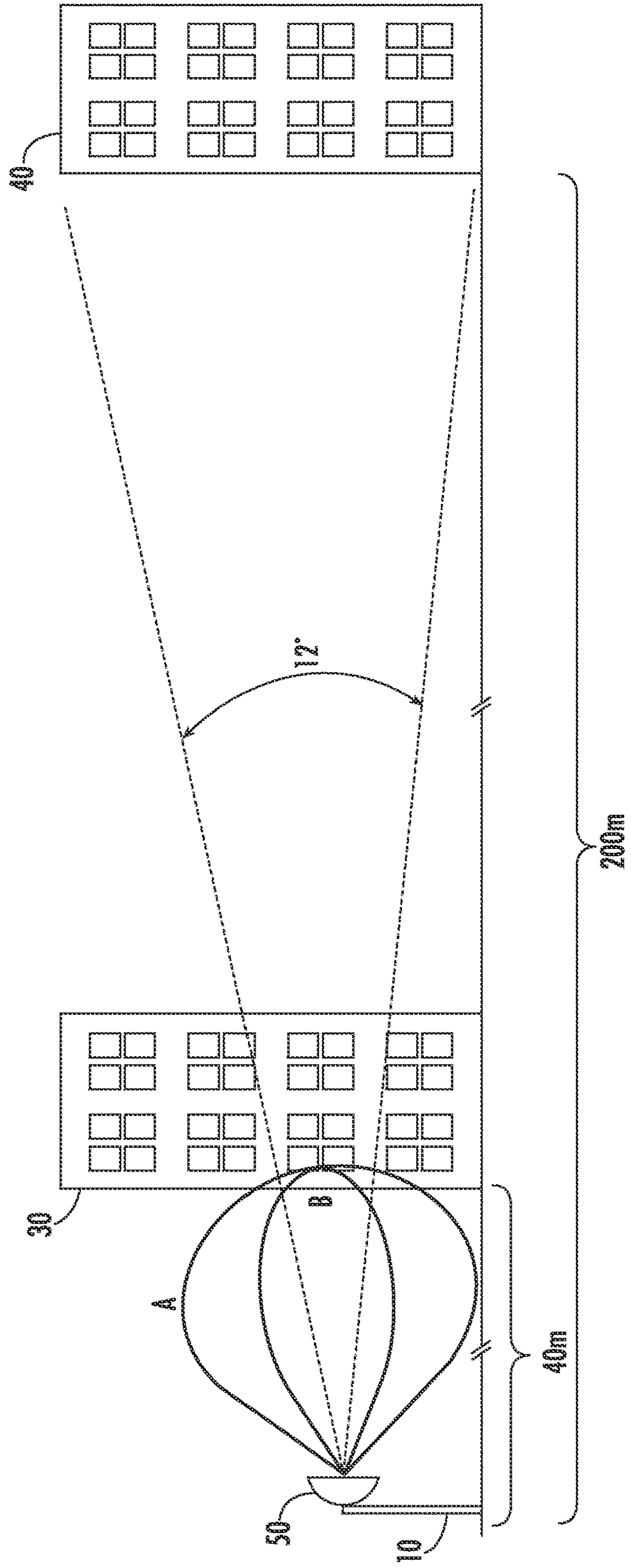
FIG. 3 is a schematic diagram that illustrates how using switched elevation beamwidths according to embodiments of the present invention may be used in lieu of elevation beam steering.

Pursuant to embodiments of the present invention, base station antennas are provided that have an elevation beamwidth that may be switched between two or more states depending on the range of the subscriber from the base station. For distant users, the antenna beam would be set to have a narrow elevation beamwidth to provide high gain and/or to reduce interference into neighboring cells. For example, referring to FIG. 3, it can be seen that if antenna 50 generates an antenna beam B having a 12° elevation beamwidth it may do a good job of illuminating users at distances of 200 meters or more. In order to communicate with nearby users, the elevation beamwidth of antenna 50 may be switched to have a wide elevation beamwidth of, for example, 40-50°, which allows the antenna 50 to illuminate nearby users at a wide range of heights without the use of elevation beam steering. When the antenna 50 is configured to have a wide elevation beamwidth, the peak gain of the antenna 50 will be reduced from that provided in the narrow beamwidth condition. However, since the wide elevation beamwidth state may only be used to serve users that are located in close proximity to the antenna 50, reliable communication can be provided to these users despite the lower EIRP. According to embodiments of the present invention, the antenna 50 can be configured to provide two, three, or any number of elevation beamwidth states as needed to balance the required elevation beamwidth against the required EIRP for users spread over a wide range of heights and distances from the antenna 50. Using the above-described switched elevation beamwidth techniques, it is possible to provide reliable coverage over a wide range of distances and subscriber heights without the use of elevation beam steering and the added complexity required to implement such elevation beam steering.

Methods of operating phased array antennas are also provided. In one example method, the phased array antenna has a plurality of radiating elements that are arranged in rows and columns to form a two-dimensional array of radiating elements. An azimuth pointing direction of an antenna beam that is generated by the phased array antenna may be selected on a time-slot-to-time slot basis by phase weighting the RF signals that are provided to the radiating elements in the respective columns by respective ones of a plurality of transceivers. Likewise, an elevation pointing direction of an antenna beam that is generated by the phased array antenna may be selected on a time-slot-to-time slot basis by phase weighting the RF signals that are provided to the radiating elements in the respective columns by respective ones of a plurality of transceivers. At the same time, an elevation beamwidth of the antenna beam may also be selected on the time-slot-to-time slot basis by using switches to select a number of radiating elements in each column that are electrically connected to the respective transceivers.

Embodiments of the present invention will now be described in further detail with reference to FIGS. 4-15.

To communicate with users located at, for example, 200 meters or more from the base station antenna 50, the EIRP must be set at a level sufficient to provide acceptable signal-to-noise ratio at the receiver on the user's device (e.g., cell phone). The required EIRP is normally achieved by providing high antenna gain through the use of high directivity pencil beams and the transmit power of the RF signals transmitted by the base station are then scaled appropriately to provide the proper EIRP to the user (the transmit power is scaled because too high an EIRP value may be undesirable, as the high power signal may provide little performance improvement and be seen as interference on other wireless communications links).

To communicate with users positioned in close proximity to the base station antenna 50 (e.g., within 15 to 30 meters), the EIRP requirement is significantly lower than the EIRP required at 200 meters or more, as the free space loss of the transmitted signal increases exponentially with increasing distance, and hence is much lower for users in close proximity to the base station antenna 50. Since the EIRP requirement is lower, the elevation beamwidth can be made wider and the resulting reduction in antenna gain may still be tolerated (i.e., the minimum required EIRP level may still be achieved).

Figure 4:
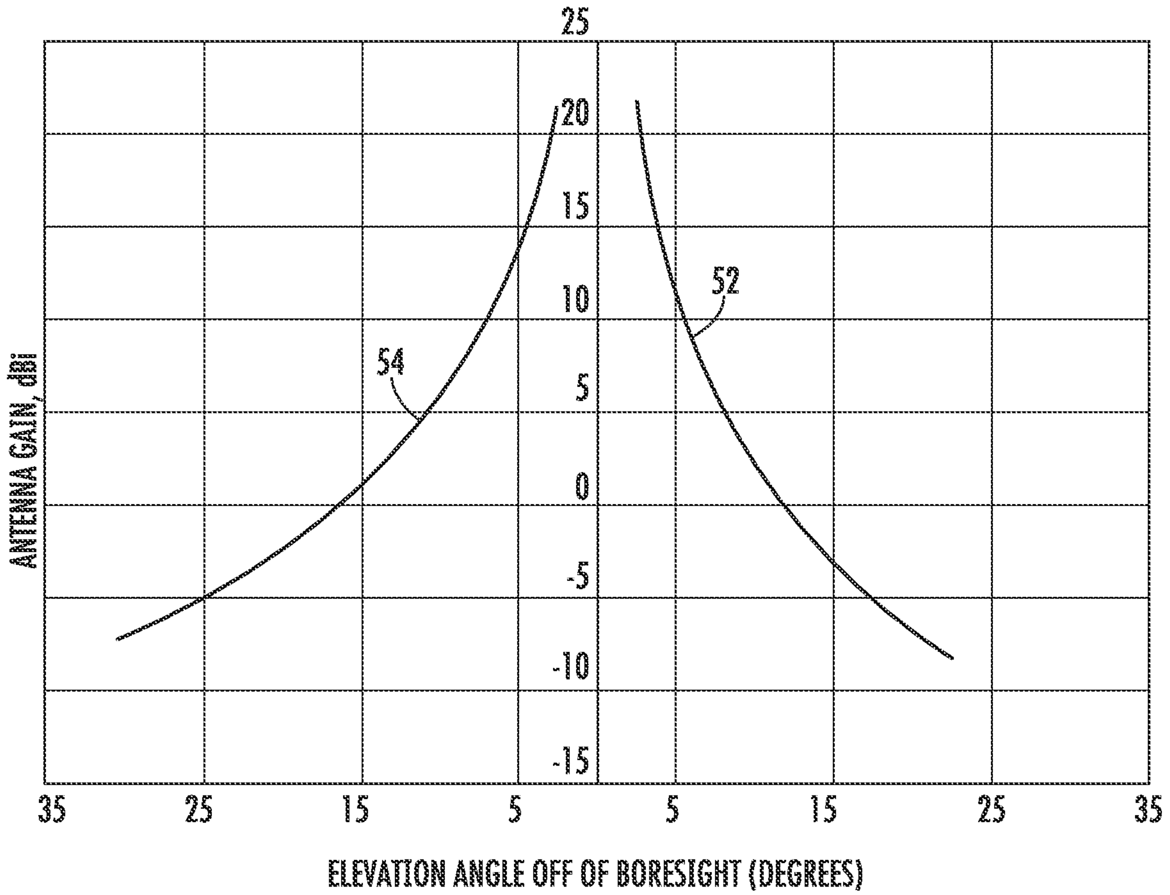
FIG. 4 is a graph that illustrates the required antenna gain as a function of the location of a user from the elevation boresight angle of an antenna where the required antenna gain is normalized to the effective isotropic radiated power required to provide reliable communications at a distance of 200 meters from a base station.

The minimum required EIRP to provide an acceptable level of service to a user is a function of the distance or "range" of the user from the base station antenna, since free space loss is a function of distance. As shown above with reference to FIGS. 1-2, the necessary elevation beamwidth to illuminate a user with an antenna beam is also a function of range, with larger elevation beamwidths being necessary as the range decreases. FIG. 4 is a graph that illustrates the required antenna gain as a function of the location of a user off the elevation boresight angle of the antenna, where the required antenna gain is normalized to the EIRP required to provide reliable communication at a distance of 200 meters.

Referring to FIG. 4, two different scenarios are illustrated. In the first scenario, which is shown by curve 52 on the right side of the graph, it was assumed that the phased array antenna was at a height of three meters above a reference elevation (e.g., sea level) and that the user was at a height of nine meters above the reference elevation. The curve 52 covers users at ranges of 15 meters to 200 meters from the base station antenna. As shown by one end of curve 52 in FIG. 4, when the user is at a distance of 200 meters from the base station antenna, the user is at an elevation angle of about 2.5° from the boresight elevation angle of the antenna beam. As can be seen at the other end of curve 52, when the user is at a distance of 15 meters from the base station antenna, the user is at an elevation angle of about 22° from the boresight elevation angle of the antenna beam. Curve 52 also shows that the antenna gain required to achieve comparable performance at these two distances/elevation angles from the boresight elevation angle drops from about 22 dBi at 200 meters to about −8 dBi at 15 meters or a difference of about 30 dB. Curve 54 on the left side of FIG. 4 plots the same data for the case where it was assumed that the base station antenna was at a height of ten meters above the reference elevation and the user was at a height of one meter above the reference elevation.

As will be shown below, analysis of FIG. 4 leads to the conclusion that while it may not be necessary to provide elevation beam steering, it may still be necessary to provide some level of beamwidth control in the elevation plane to meet the high directivity requirements for users that are relatively far from the base station antenna and wide beamwidth requirements for users that are close to the base station antenna.

Pursuant to embodiments of the present invention, phased array antennas are provided that include at least one column (i.e., a vertically-disposed linear array) of radiating elements. One or more transceivers are provided, with each transceiver being coupled to a respective one of the columns of radiating elements (instead of providing a transceiver for each radiating element as is typically done with beam steering antennas). The elevation beamwidth (and hence directivity) is controlled using one or more switches that may be embedded in the phased array antenna to control the number of radiating elements in each column that are connected to the transceiver for the column, thereby effectively controlling the length of the phased array antenna. Since the elevation beamwidth is a function of the length of the column of radiating elements (i.e., the distance between the top and bottom radiating elements in each linear array), the phased array antennas according to embodiments of the present invention may generate antenna beams having different elevation beamwidths.

In one example embodiment, the phased array antenna may include sixty-four radiating elements that are arranged in a two-dimensional array having eight vertically-disposed columns and eight horizontally-disposed rows of radiating elements. The radiating elements may be spaced-apart at appropriate intervals relative to the wavelength of the radiated signal (typically adjacent radiating elements are spaced about 0.5 to 0.65 wavelengths apart in the vertical direction, and at least 0.5 wavelengths in the horizontal direction, although other spacings are possible). The eight radiating elements in each column may be connected by a feed network to a respective one of eight transceivers (i.e., each column of radiating elements may be fed by a single transceiver). By switching some of the eight radiating elements in each column out of the linear array (i.e., by effectively disconnecting a subset of the radiating elements in each column from their associated transceiver), the elevation beamwidth of the antenna may be adjusted. For example, when all eight rows of radiating elements are switched into the array, the antenna may provide a relatively narrow beamwidth of approximately 10 degrees. By switching three of the rows of radiating elements (i.e., the top three rows or the bottom three rows) out of the array, the beamwidth is widened to approximately 20 degrees. By switching five of the rows of radiating elements out of the array (so that only three rows of radiating elements are active), the beamwidth is widened further to approximately 30 degrees.

Figure 5:
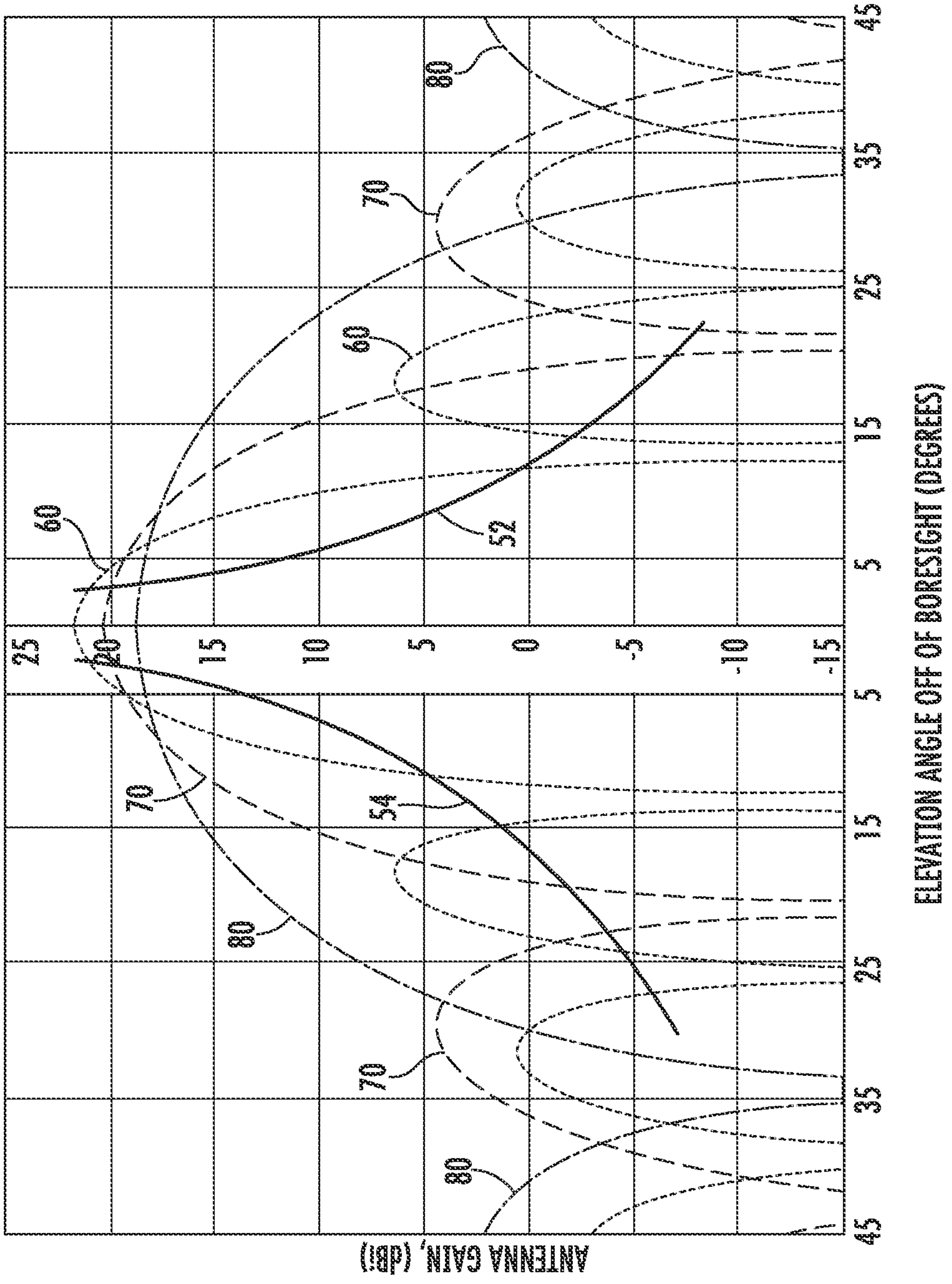
FIG. 5 is the graph of FIG. 4 with the gain of an antenna according to embodiments of the present invention as a function of elevation beamwidth superimposed thereon for three different configurations of the antenna.

FIG. 5 is a reproduction of the graph of FIG. 4 that further shows the antenna gain as a function of elevation angle off of boresight for the above-described sixty-four radiating element phased array antenna for three different switching states of the antenna, namely a first state where all eight rows of radiating elements in the array are active (curve 60), a second state where five of the eight rows of radiating elements in the array are active (curve 70) and a third state where only three of the eight rows of radiating elements in the array are active (curve 80). As can be seen in FIG. 5, the antenna provides the highest gain in the first state (when all sixty-four radiating elements are active) for elevation beamwidths of 10° (−5° to 5°) or less. For elevation beamwidths of −30° to −7° and from 7° to 30°, the antenna provides the highest gain in the third state (only twenty-four active radiating elements). For elevation beamwidths from −7° to −5° and from 5° to 7°, the antenna provides the highest gain in the second state (forty active radiating elements). However, it can also be seen from FIG. 5 that by using either the first or third states it is possible to meet the antenna gain requirements for users that are at various heights both close and far away from the base station antenna, and that the increase in gain provided by using the second state is very small (from 0-2 dBi). Thus, a phased array antenna having an elevation beamwidth switchable between two states may provide high antenna gain to users located at a wide variety of distances and heights from the antenna.

Figure 6:
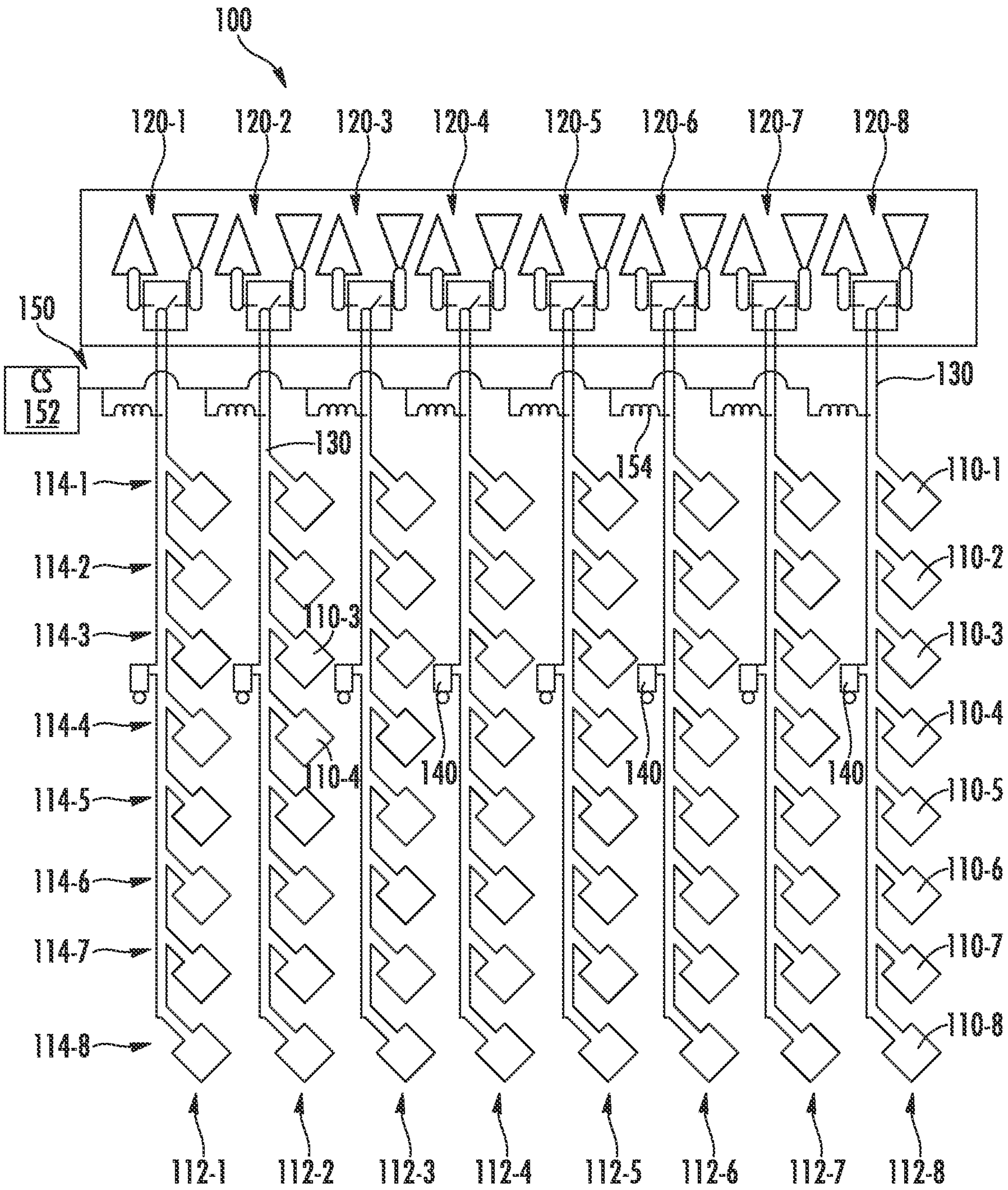
FIG. 6 is a schematic block diagram of a phased array antenna having a switchable elevation beamwidth according to embodiments of the present invention.

FIG. 6 is a schematic block diagram of a phased array antenna 100 having a switchable elevation beamwidth according to embodiments of the present invention. As shown in FIG. 6, the antenna 100 includes sixty-four radiating elements 110 that are arranged in a two-dimensional array that has eight columns 112-1 through 112-8 and eight rows 114-1 through 114-8 so that eight radiating elements 110-1 through 110-8 are included in each column 112 and in each row 114. While this example is shown with eight columns and eight radiating elements per column, the techniques disclosed herein can be applied to a phased array antenna with any number of row and/or columns and any number of radiating elements greater than one. The antenna 100 is an active antenna that has eight transceivers 120-1 through 120-8, with a transceiver 120 provided for each respective column 112. Eight feed networks 130 are also provided. Each feed network 130 connects a respective one of the transceivers 120 to the radiating elements 110 in the column 112 that is fed by the transceiver 120. The antenna 100 further includes eight switches 140, with one switch 140 provided for each column 112. Each switch 140 may be placed at the same location along its respective column 112, namely between the same two radiating elements 110 of each column 112. In the depicted embodiment, each switch 140 is positioned between radiating elements 110-3 and 110-4 in each column 112. Finally, the phased array antenna 100 may include a switch control network 150 that may be used to set the position of each switch 140. While the example shown in FIG. 6 is illustrated using a rectangular lattice structure for the phased array, embodiments of the present invention also include phased array antennas having a triangular lattice, an irregularly spaced lattice, or other lattice structure. While the example shown in FIG. 6 is illustrated using a rectangular array in which each column has the same number of array elements, embodiments of the present invention also include phased array antennas having other array shapes such as circular, triangular, or other polygons in which the number of elements in each of the columns is not equal.

The phased array antenna 100 may comprise, for example, a base station antenna. The radiating elements 110 may comprise any appropriate radiating element such as, for example, dipole or patch radiating elements. While the description of example embodiments herein primarily focuses on patch and dipole radiating elements, it will be appreciated that in other embodiments the radiating elements may be any appropriate radiating element including monopole, dielectric, bowtie, notch, tapered notch, Vivaldi, waveguide, or any other type of radiating element. The radiating elements 110 may transmit and receive signals having a first polarization or may comprise cross-polarized radiating elements that transmit and receive signals at two orthogonal polarizations. Most typically, the radiating elements 110 may be cross-polarized radiating elements. However, for ease of description, the discussion that follows will describe single polarization implementations, which can also be viewed as a description of one-half of an antenna that includes cross-polarized radiating elements 110. Thus, it will be appreciated that the discussion that follows fully supports antennas 100 having either single polarization radiating elements or cross-polarized radiating elements, both of which fall within the scope of the present invention.

The radiating elements 110 may be mounted on a planar backplane (not shown) such as, for example, a reflective ground plane formed of sheet metal. It will be appreciated, however, that the radiating elements 110 may be in a three dimensional arrangement in some embodiments. For example, if the antenna includes a cylindrical RF lens or one or more spherical RF lenses, the radiating elements 110 may be arranged in rows and columns that curve along the circumference of the RF lens.

The transceivers 120 may comprise any suitable transceivers that generate RF signals.

In the depicted embodiment, each feed network 130 comprises a linear feed network. Each linear feed network 130 may be identical in some embodiments. The linear feed networks 130 may each comprise an RF transmission line 132 such as, for example, a microstrip or stripline transmission line. The eight radiating elements 110 in a respective column 112 may be connected along the transmission line 132. An RF signal that is input onto one of the transmission lines 132 from the transceiver 120 that feeds the transmission line 130 may travel down the transmission line 132, with a respective portion or "sub-component" of the RF signal feeding into each of the eight radiating elements 110 that are connected to the transmission line 132. Each radiating element 110 may radiate a respective one of the sub-components into free space. The impedance of the transmission line 132 may vary along the length of the transmission line 132 in order to control the respective magnitudes of the sub-components of the RF signal that are fed to each radiating element 110. For example, in some embodiments, the impedance along the transmission line 132 may be varied so that each radiating element 110 receives the same amount of signal energy. In other embodiments, the radiating elements 110 in the center of each column 112 may receive more RF energy than the radiating elements 110 on either end of the column 112. Other arrangements are possible.

The radiating elements 110 may be physically spaced apart from each other along the column direction by, for example, between 0.5 to 0.65 wavelengths, where the wavelength corresponds to the center frequency of the operating frequency band of the radiating elements 110. However, the locations where adjacent radiating elements 110 connect to a transmission line 132 may be approximately one wavelength. In other words, the electrical length of the segment of each transmission line 132 between adjacent radiating elements 110 may be one wavelength and may be longer than the physical spacing between adjacent radiating elements in some embodiments. This spacing allows all radiating elements 110 to be excited in-phase, resulting in an antenna beam that extends perpendicularly from the antenna 100. In other embodiments, the electrical length of each segment of the transmission line 132 that extends between adjacent radiating elements 110 may be either greater than or less than one wavelength in order to provide a fixed tilt to the elevation pattern of the antenna beam.

Figure 7:
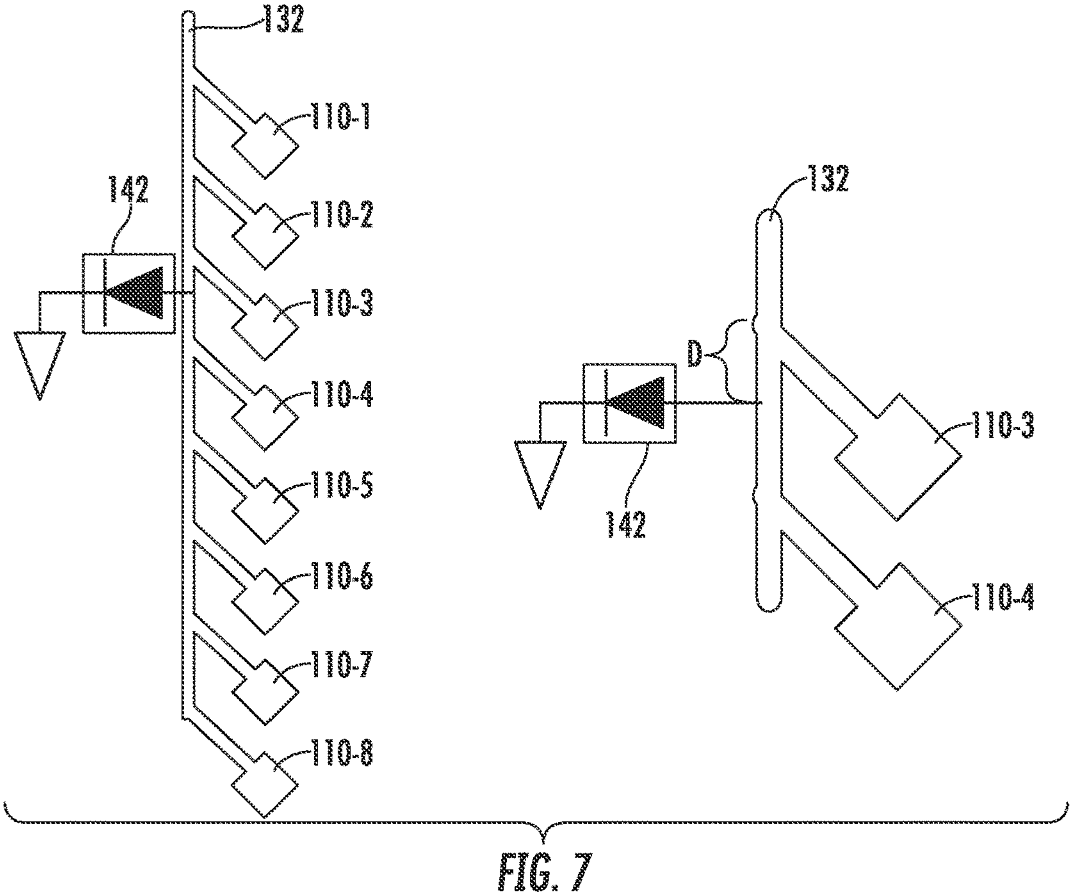
FIG. 7 is a schematic diagram of one of the columns of radiating elements of the antenna of FIG. 6 that illustrates an implementation of one of the switches using a PIN diode.

In some embodiments, each switch 140 may be implemented, for example, using a PIN diode 142 (see FIG. 7) that has one end connected to the transmission line 132 and the other end connected to ground (or another reference voltage). FIG. 7 is a schematic diagram that illustrates one of the columns 112 of phased array antenna 100. FIG. 7 also includes (on the right side) an enlarged view that illustrates the connection between the PIN diode 142 and the transmission line 132. As shown in FIG. 7, the anode terminal of the PIN diode 142 is connected to the transmission line 132, and the cathode terminal of the PIN diode 142 is connected to ground (or another reference voltage). The anode may connect to the transmission line 132 at a distance of $D=[0.25+(n*0.5)]\lambda$ from the point along the transmission line 132 where the last radiating element 110 prior to the PIN diode 142 connects to the RF transmission line 132, as is shown graphically in FIG. 7. In the above equation, $\lambda$, is the wavelength corresponding to the center frequency of the frequency band at which the radiating elements 110 are designed to operate, and n is an integer having a value of zero or greater.

Figure 19:
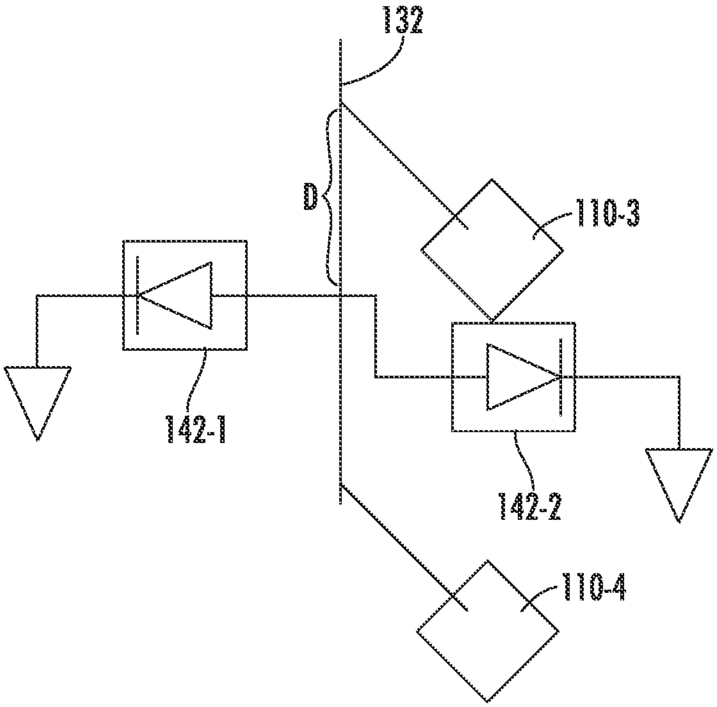
FIG. 19 is a schematic diagram illustrating how a pair of PIN diodes may be used to reduce RF leakage currents.

By positioning the connection to each PIN diode 142 at approximately $0.25\lambda$, $0.75\lambda$, or any interval of $[0.25+(n*0.5)]\lambda$ along the transmission line 132 from the location of the radiating element 110 that is closest to the PIN diode 142 that is between the transceiver 130 and the PIN diode 142, the PIN diode 142, when (forward biased) conducting, will operate as a shunt to ground. As such, when the PIN diode 142 is forward biased (i.e., conducting), an open circuit will be realized at the feedline junction corresponding to the nearest radiating element 110 closest to the PIN diode 142 that is between transceiver 130 and the PIN diode 142, and thus only the radiating elements 110 between the transceiver 120 and the PIN diode 142 will receive and radiate an RF signal output by the transceiver 120 onto the transmission line 132. When the PIN diode 142 is unbiased or reverse biased (i.e., not conducting), the PIN diode 142 appears largely transparent along the transmission line 132 and the RF energy then passes to the ensuing radiating elements 110. In other words, if the PIN diode 142 is unbiased or reverse biased, then the RF signal is fed to all eight radiating elements 110 in the column 112, while if the PIN diode is forward biased, then RF energy is only fed to the radiating elements 110 that are between the transceiver 120 and the PIN diode 142. PIN diode 142 is forward biased when a positive DC voltage is applied to its anode relative to its cathode and is negatively biased when a negative DC voltage is applied to its anode relative to its cathode. In practice, the PIN diode 142 only provides a finite amount of isolation, and hence some residual RF current may leak past the PIN diode 142 to be radiated by the radiating elements 110 that have been switched out of the phased array antenna. This can potentially result in undesired changes in the antenna pattern. As shown in FIG. 19, in some embodiments, a pair of PIN diodes 142-1, 142-2 that extend from either side of transmission line 132 (and both connecting to the transmission line at the distance D) may be used instead of a single PIN diode 142 in order to reduce RF leakage current when the antenna is in its wide beamwidth state.

While various embodiments of the invention depicted herein implement the switches 140 using PIN diodes 142, it will be appreciated that other types of switches 140 may be used. For example, a wide variety of semiconductor switches are known in the art that may be suitable for use as the switches 140 including, for example, power MOSFET or power bipolar junction transistors such as gallium nitride based, silicon-on-insulator (SOI) or silicon carbide based transistor switches. Additionally, other suitable semiconductor switching devices may be used including, for example, insulated gate bipolar transistors, thyristors, other types of diodes and the like. Additionally, non-semiconductor based switching devices such as MEMS devices may be used. Thus, it will be appreciated that any appropriate switches 140 may be used. The switching devices may be placed into the array circuit either as shunt elements per the examples illustrated herein or as series switching elements within the transmission lines or embedded within the radiating element or on the feed lines to the radiating elements.

Referring again to FIG. 6, the switch control network 150 may be implemented as a current source 152 that provides a direct current (DC) bias current to each of the transmission lines 132. In the embodiment of FIG. 6, the same DC bias current may be supplied to all eight transmission lines 132. Respective inductors 154 are provided along each connection between the current source 152 and the respective transmission lines 132 that may block RF energy from passing to the current source 152. The DC current source 152 may be controlled, for example, in response to a control signal provided from an external source. When no DC bias current is output to the transmission lines 132, the PIN diodes 142 are unbiased. When a negative DC bias voltage is applied to the transmission lines 132, the PIN diodes 142 are reverse biased. In these bias states, the PIN diodes 142 exhibit a high impedance and may be essentially transparent to the transmission lines 132. Accordingly, in these states, all eight radiating elements 110 of each column will be fed RF signals from the transceivers 120.

When the DC current source 152 is controlled to output a positive DC bias current to the transmission lines 132, the PIN diodes 142 become forward biased, and may appear as a low impedance short circuit to ground along each transmission line 132. When this occurs, the higher impedance along the remainder of each transmission line 132 (i.e., the portion of each transmission line 132 that is not between the transceivers 120 and the PIN diodes 142) appears as an open circuit, and only a very small amount of RF energy will flow down these portions of the respective transmission lines 132.

If the phased array antenna 100 is configured as shown in FIG. 6 with each PIN diode 142 positioned between the third and fourth radiating elements 110-3 and 110-4 in the respective columns 112, then when the PIN diodes 142 are forward biased, each column 112 will only radiate RF energy through the first three radiating elements 110-1 through 110-3, as the RF energy that travels along each RF transmission line 132 past the third radiating element 110-3 is short-circuited to ground. Since the RF current would only flow to the first three radiating elements 110-1 through 110-3 in each column 112, the elevation beamwidth is widened considerably.

To select the eight radiating element 110 configuration for each column 112, the PIN diodes 142 would be unbiased or reverse biased and in a high impedance state. With the PIN diodes 142 in this high impedance state, RF current is able to pass to all eight radiating elements 110. Therefore, the elevation beamwidth would be formed from all eight radiating elements 110 creating a narrow beamwidth, high gain antenna beam.

While in the example of FIG. 6, a single PIN diode 142 is provided along each transmission line 132 between the third and fourth radiating elements 110-3, 110-4, it will be appreciated that the PIN diodes 142 can alternatively be positioned in other locations along each transmission line 132 so that different numbers of radiating elements 110 in each column 112 may radiate RF energy when the PIN diodes 142 are in their respective forward bias states. For example, in other embodiments, the PIN diodes 142 may be located between the first and second radiating elements 110-1, 110-2, between the second and third radiating elements 110-2, 110-3, between the fourth and fifth radiating elements 110-4, 110-5, between the sixth and seventh radiating elements 110-6, 110-7 or between the seventh and eighth radiating elements 110-7, 110-8. Moreover, as will be discussed below, in some embodiments multiple switches 140 may be provided along each transmission line 132 that may be separately controlled so that the phased array antenna 100 may operate in more than two different elevation beamwidth states.

Figure 8:
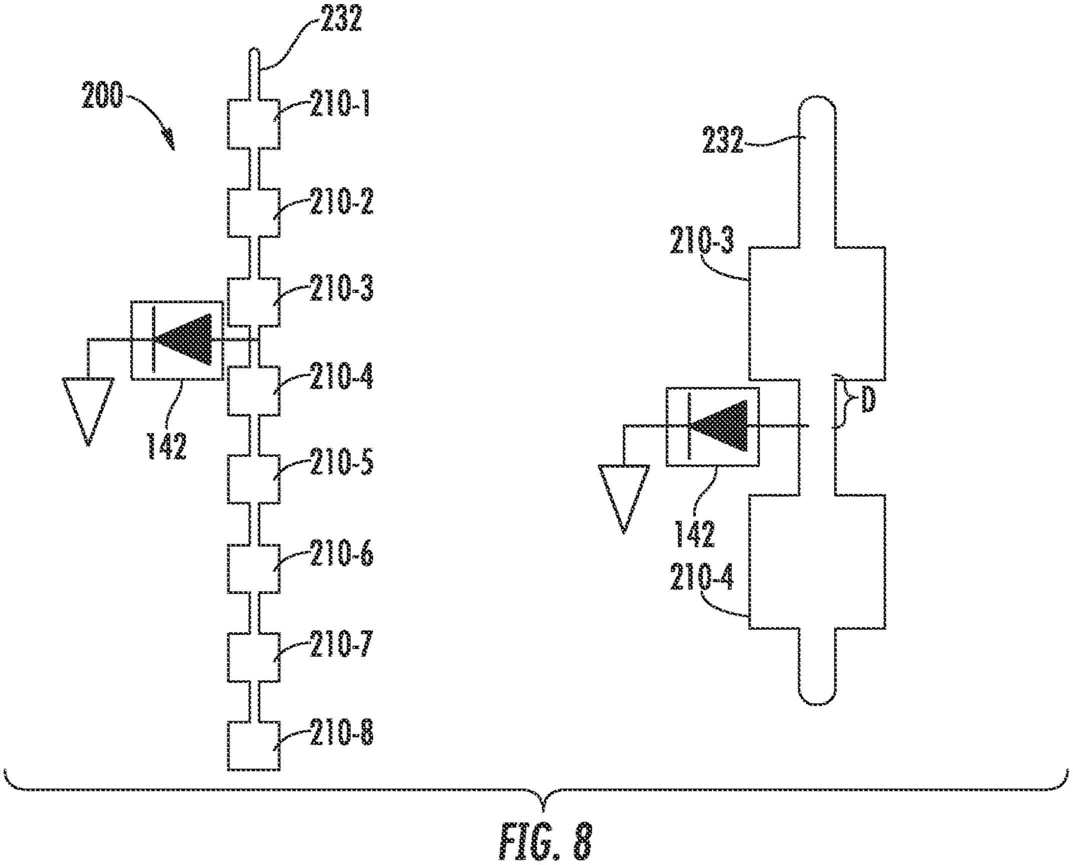
FIG. 8 is a schematic diagram of a column of radiating elements of a phased array antenna according to further embodiments of the present invention.

FIG. 8 is a schematic diagram of one column 212 of an eight row, eight column phased array antenna 200 according to further embodiments of the present invention, that further includes an enlarged view illustrating the connection of a PIN diode 142 to the transmission line 232 along the depicted column 212. While not shown in FIG. 8, it will be appreciated that the phased array antenna 200 further includes eight transceivers 120 and a switch control network 150, and will include seven additional columns 212 so that the phased array antenna 200 may be nearly identical to the phased array antenna 100 that is discussed above, except that each feed network is implemented as a serially feed network 230 as opposed to the linear feed networks 130 that are included in the phased array antenna 100.

Referring to FIG. 8, the phased array antenna 200 includes radiating elements 210 which may be, for example, patch radiating elements. As known to those of skill in the art, a patch radiating element refers to a (typically) microstrip-based radiating element that comprises a flat, rectangular piece of metal mounted over a ground plane. The rectangular piece of metal and the ground plane together form a resonant section of microstrip transmission line. The feed network 230 comprises a transmission line 232 (e.g., a microstrip transmission line) that feeds directly through the patch radiating elements 210. The dimensions of the transmission line 232 may be controlled relative to the dimensions of the patch radiating elements 210 (all of which may have the same dimensions) to control the amount of RF energy that is radiated at each patch radiating element 210 as compared to the amount of RF energy that continues to flow down the transmission line 232.

As with the phased array antenna 100 of FIG. 7, a PIN diode 142 that acts as a switch 140 is located along the transmission line 232 between the third and fourth radiating elements 210-3, 210-4. The PIN diode 142 may connect to the transmission line 132 at an interval of [0.25+(n*0.5)]λ from the location of the radiating element 210 that is closest to the PIN diode 142 that is between the transceiver 120 (see FIG. 6) and the PIN diode 142. When the PIN diode 142 is unbiased or reverse biased, it appears transparent to RF energy and hence an RF signal output by the transceiver 120 will flow to all eight radiating elements 210. If, however, the PIN diode 142 is forward biased, then it acts as a shunt to ground and any RF signal output by the transceiver 120 will only be radiated by the first three radiating elements 210 in each column of the antenna 200. It will be appreciated that the PIN diode 142 may be located between any other adjacent pair of radiating elements 210 in other embodiments. The location of the PIN diode 142 may be selected based on a desired elevation beamwidth for the phased array antenna 200 when operating to have a widened elevation beamwidth.

Other than the above-described differences, the structure and operation of the phased array antenna 200 may be identical to the structure and operation of the phased array antenna 100, and hence further description thereof will be omitted.

Figure 9:
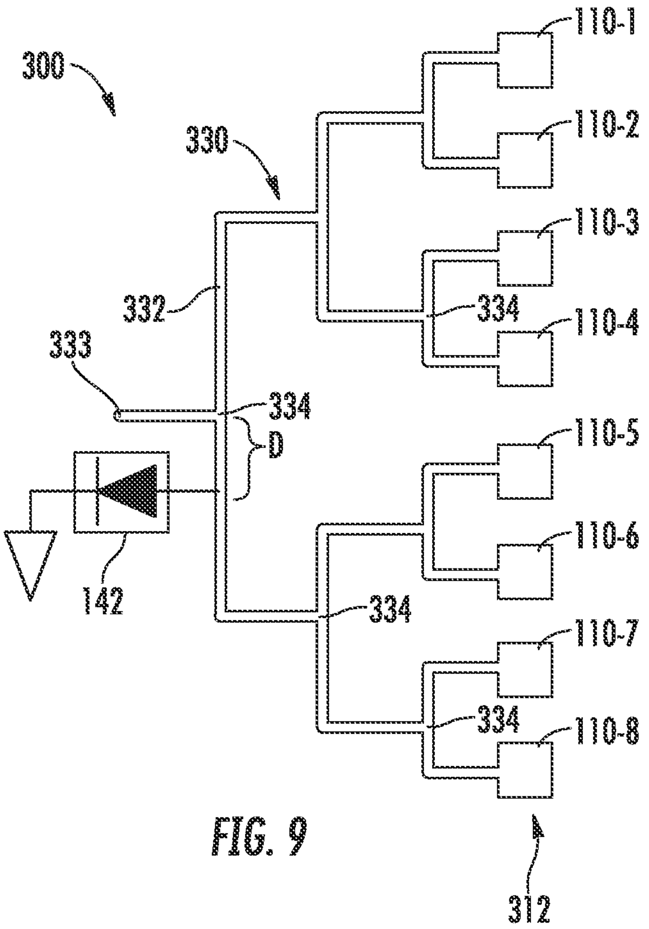
FIG. 9 is a schematic diagram of a column of radiating elements of a phased array antenna according to still further embodiments of the present invention.

FIG. 9 is a schematic diagram of one column 312 of an eight row, eight column phased array antenna 300 according to further embodiments of the present invention. The phased array antenna 300 is nearly identical to the phased array antenna 100 that is discussed above, except that the each linear feed network 130 included in phased array antenna 100 is replaced with a respective corporate feed network 330 in the phased array antenna 300.

Referring to FIG. 9, the phased array antenna 300 includes radiating elements 110 which may be, for example, dipole or patch radiating elements. Each radiating element 110 in a column 312 of the antenna 300 is connected to a transceiver 120 (see FIG. 6) via a corporate feed network 330. The transceiver 120 connects to the end 333 of the feed network 330 in FIG. 9. The corporate feed network 330 may comprise a plurality of transmission line segments 332 that are arranged in a “branch” structure. At each branch location 334 where three transmission line segments 332 meet, an RF signal on the first transmission line segment 332 may split into two sub-components, which flow down the respective second and third transmission line segments 332. In some embodiments, the RF signal may split evenly at each such branch location 334, although this need not be the case.

As further shown in FIG. 9, a PIN diode 142 that acts as a switch 140 is located along one of the transmission line segments 332. In the embodiment of FIG. 9, the PIN diode 142 is located adjacent the branch that is closest to the end 333 of the feed network 330 that is the root of the branch structure. The PIN diode 142 may be positioned at an interval of D=[0.25+(n*0.5)]λ from the first branch location 334. When the PIN diode 142 is unbiased or reverse biased, the PIN diode 142 appears transparent to RF energy and hence an RF signal output by the transceiver 120 (see FIG. 6) feeding a column 312 will flow to all eight radiating elements 110 in the column 312. If, however, the PIN diode 142 is forward biased, then it acts as a shunt to ground and any RF signal output by the transceiver 120 will only be radiated by the first four radiating elements 110-1 through 110-4 in the column 312.

Figure 10:
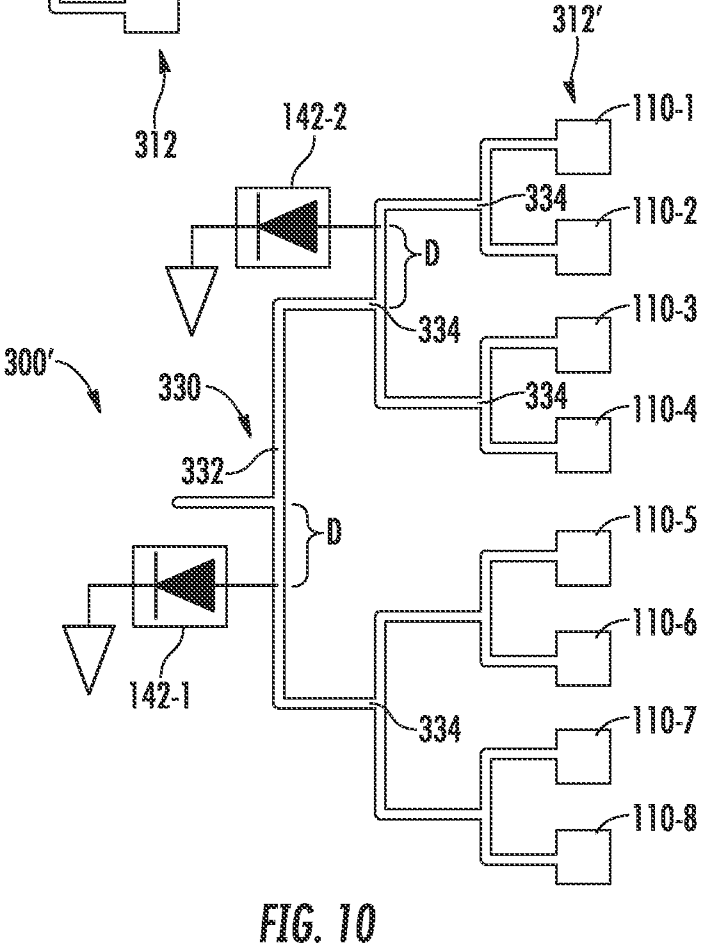
FIG. 10 is a schematic diagram of a modified embodiment of the phased array antenna of FIG. 9.

It will be appreciated that the PIN diode 142 may be located adjacent any of the branches in each corporate feed network 330, and/or that more than one PIN diode 142 may be included along each corporate feed network 330. For example, FIG. 10 is a schematic diagram of one column 312' of a modified version 300' of the phased array antenna 300. As shown in FIG. 10, in this modified embodiment, a second PIN diode 142-2 is located adjacent one of the second level branch locations 334. When the PIN diodes 142-1, 142-2 of the embodiment of FIG. 10 are forward biased, then the first and second radiating elements 110-1, 110-2, as well as the fifth through eighth radiating elements 110-5 through 110-8 will effectively be switched out of the phased array antenna 300'. In this case, the elevation beamwidth of the phased array antenna 300' will be the elevation beamwidth of a phased array antenna having two radiating elements per column.

Other than the above-described differences, the structure and operation of the phased array antennas 300, 300' may be identical to the structure and operation of the phased array antenna 100, and hence further description thereof will be omitted.

Figure 11:
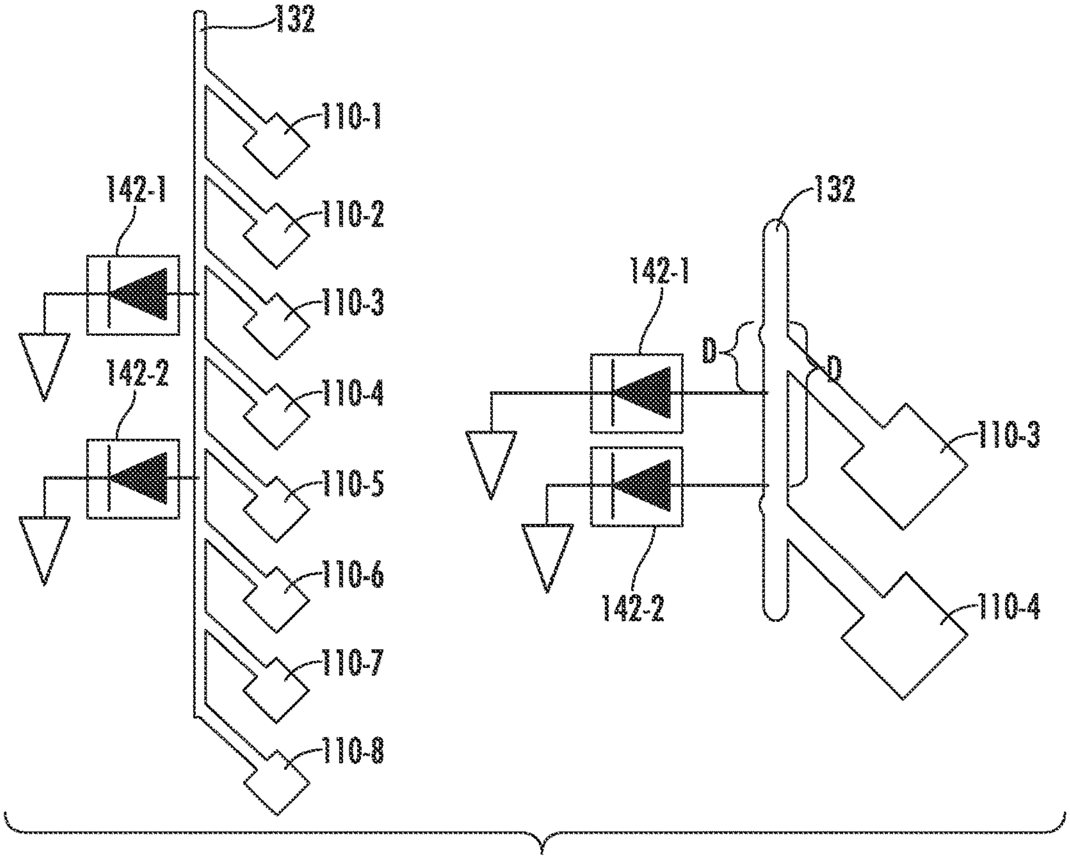
FIGS. 11-13 are schematic diagrams of a representative column of radiating elements of modified versions of the phased array antennas of FIGS. 6, 8 and 9, respectively.
Figure 12:
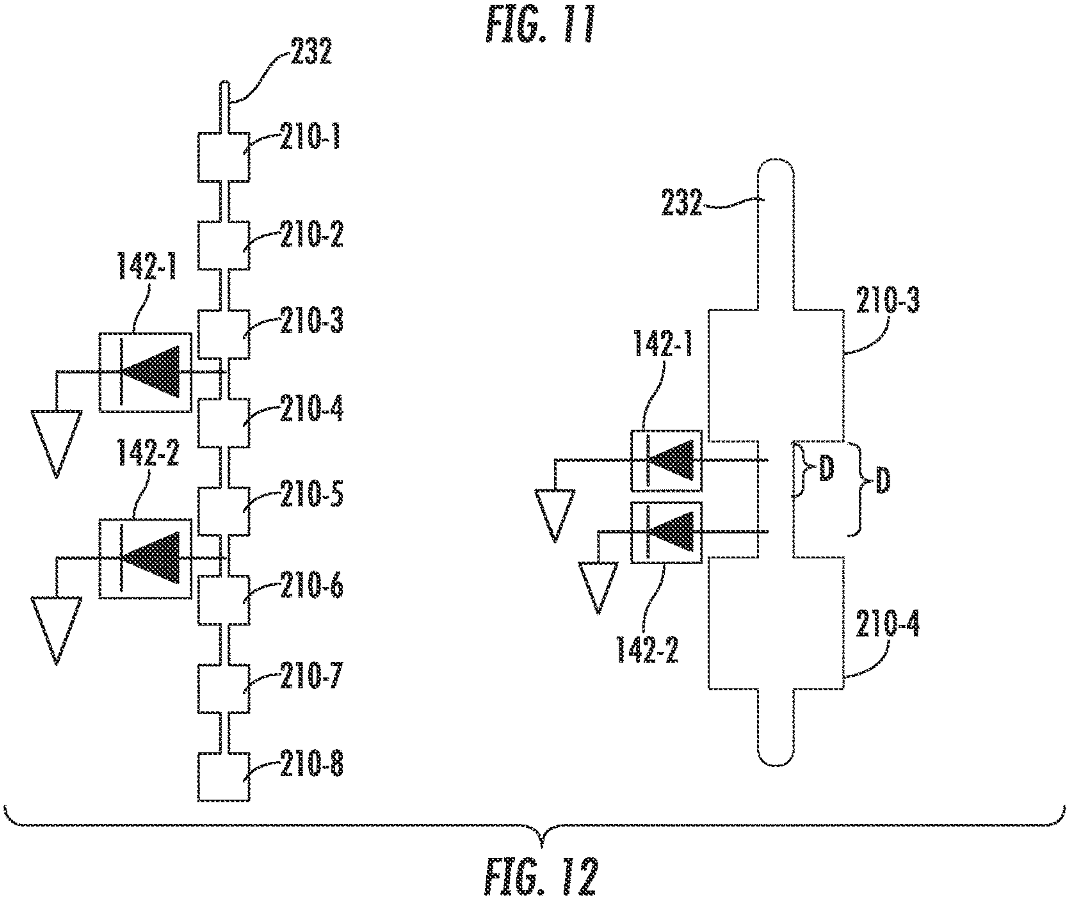
Figure 13:
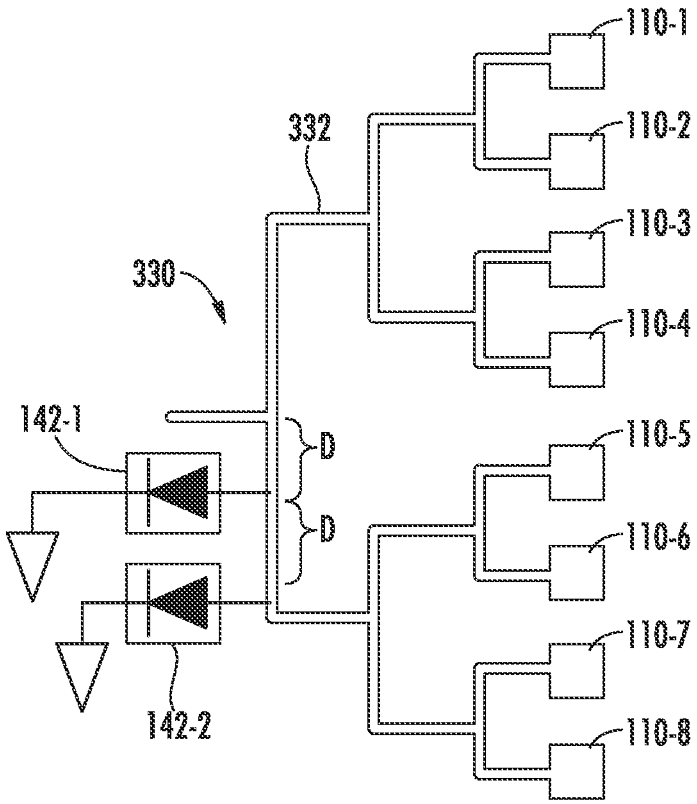
Figure 14:
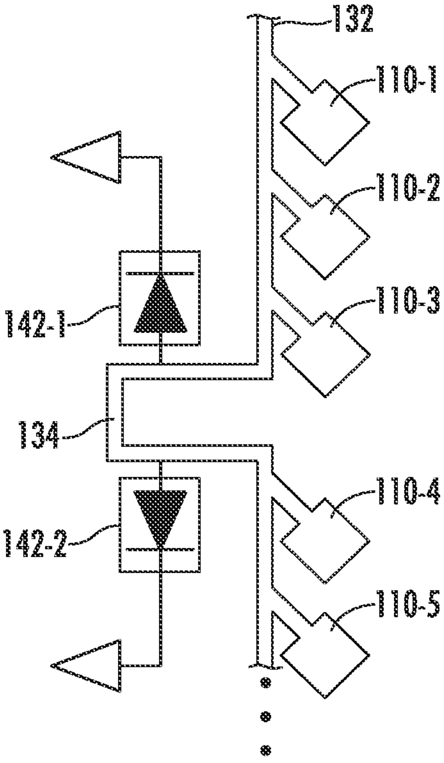
FIG. 14 is a schematic diagram of a portion of a column of a phased array antenna according to embodiments of the present invention that has an extended length transmission line segment between a pair of adjacent radiating elements.

It will also be understood that any of the above-described phased array antennas may be modified to include two or more PIN diodes 142 per column of radiating elements for the purpose of achieving increased isolation for the RF signal from the deselected elements when the antennas are operating in their respective wide elevation beamwidth states. In practice, each PIN diode 142 (or other switch 140) only provides a finite amount of isolation, and hence some residual RF current may leak past each PIN diode 142 to be radiated by the radiating elements 110, 210 that have been switched out of the phased array antenna. This can potentially result in undesired changes in the antenna pattern. As shown in FIGS. 11-13, multiple PIN diodes 142 may be provided along each column to reduce RF leakage current when the respective antennas are in their wide beamwidth states. As shown on the left sides of FIGS. 11-13, in some embodiments the PIN diodes 142 may be positioned between different pairs of adjacent radiating elements 110, 210. This may be convenient because additional physical space may be available. As shown on the right sides of FIGS. 11-13, in other embodiments the additional PIN diodes 142 may be placed between the same pairs of adjacent radiating elements 110, 210 and spaced at intervals of D from the two radiating elements 110, 210 along the feeding transmission line 132, 232. In some embodiments an extended length transmission line segment 134 may be provided between a pair of adjacent radiating elements 110, 210 that is one or more wavelengths longer than the transmission line segments that extend between other adjacent pairs of radiating elements 110, 210. This extended length transmission line segment 134 may provide additional physical room for locating two PIN diodes 142 along a column between the same pair of adjacent radiating elements 110, 210. The isolation added by the second PIN diode 142 may have maximum effectiveness if both PIN diodes 142 are located between the same pair of adjacent radiating elements 110, 210. FIG. 14 schematically illustrates a portion of a column of a phased array antenna according to embodiments of the present invention that has an extended length transmission line segment 134 that provides additional physical room for locating two PIN diodes 142-1, 142-2 along a column between the same pair of adjacent radiating elements 110, 210.

Figure 18:
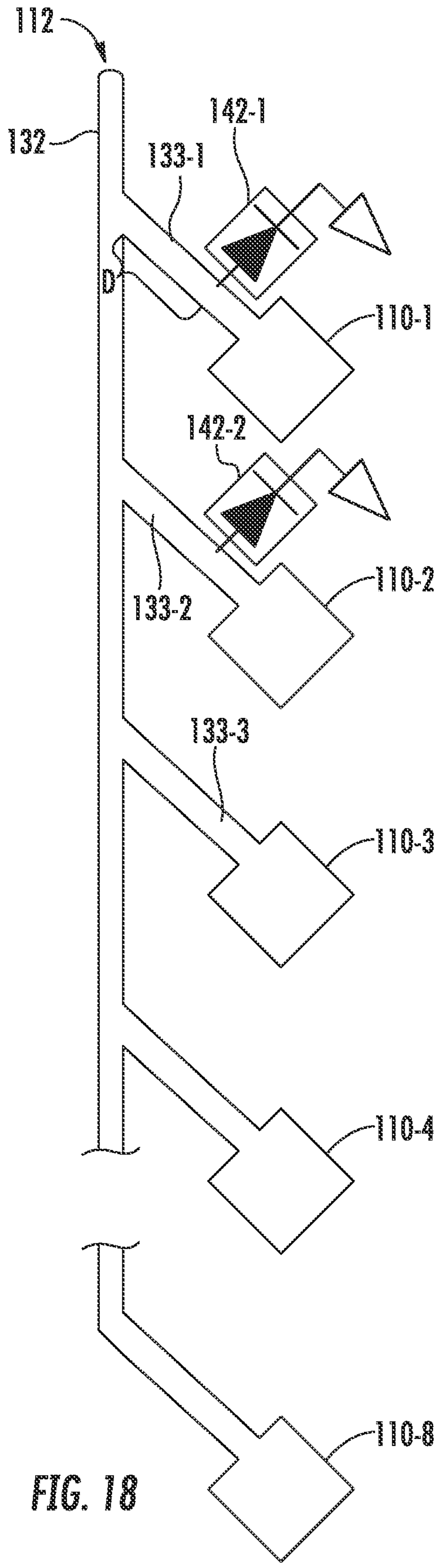
FIG. 18 is a schematic diagram of a column of radiating elements of a phased array antenna according to still further embodiments of the present invention.

As shown in FIG. 18, according to still further embodiments of the present invention, the PIN diodes 142 may be positioned on the individual transmission line branches 133 that connect each radiating element 110 to the transmission line 132. In such embodiments, each PIN diode 142 may be located at a quarter-wavelength from the junctions where each transmission line branch 133 intersects the transmission line 132, or at odd integer multiples of a quarter-wavelength such as 1, 3, 5, 7, etc. Using this technique, individual radiating elements 110 can be shunted to provide an alternate means to configure the array size (i.e., the number of radiating elements 110 included in each column 112 of the phased array antenna) for the purpose of controlling the elevation beamwidth. In the example of FIG. 18, the illustrated column 112 of the phased array antenna can be operated with all eight radiating elements 110 per column 112 to provide a narrow elevation beamwidth by reverse biasing or unbiasing the PIN diodes 142-1, 142-2. By forward biasing the PIN diode 142-1 located on the transmission line branch 133-1 to radiating element 110-1, the phased array antenna will then operate with only radiating elements 110-2 through 110-8 active. By forward biasing the PIN diodes 142-1, 142-2 located on both transmission line branches 133-1, 133-2, the phased array antenna will then operate with only radiating elements 110-3 through 110-8 active to provide a somewhat wider elevation beamwidth. When the PIN diodes 142 are reverse biased or unbiased, they appear in a high impedance state and allow RF power to radiate from their associated radiating elements 110. When forward biased, the PIN diodes 142 act as short circuits to ground which in turn appears as an open circuit at the respective junctions of the transmission line branches 133 and the transmission line 132. This forward biased state prevents RF power from radiating from the associated radiating elements 110 without shorting out the main transmission line 132 to ground. While PIN diodes 142 are illustrated on the transmission line branches 133-1 and 133-2, it will be appreciated that PIN diodes may be included on more or fewer of the transmission line branches 133 and may be included on transmission line branches 133 at both ends of the column 112, if desired.

Figure 15:
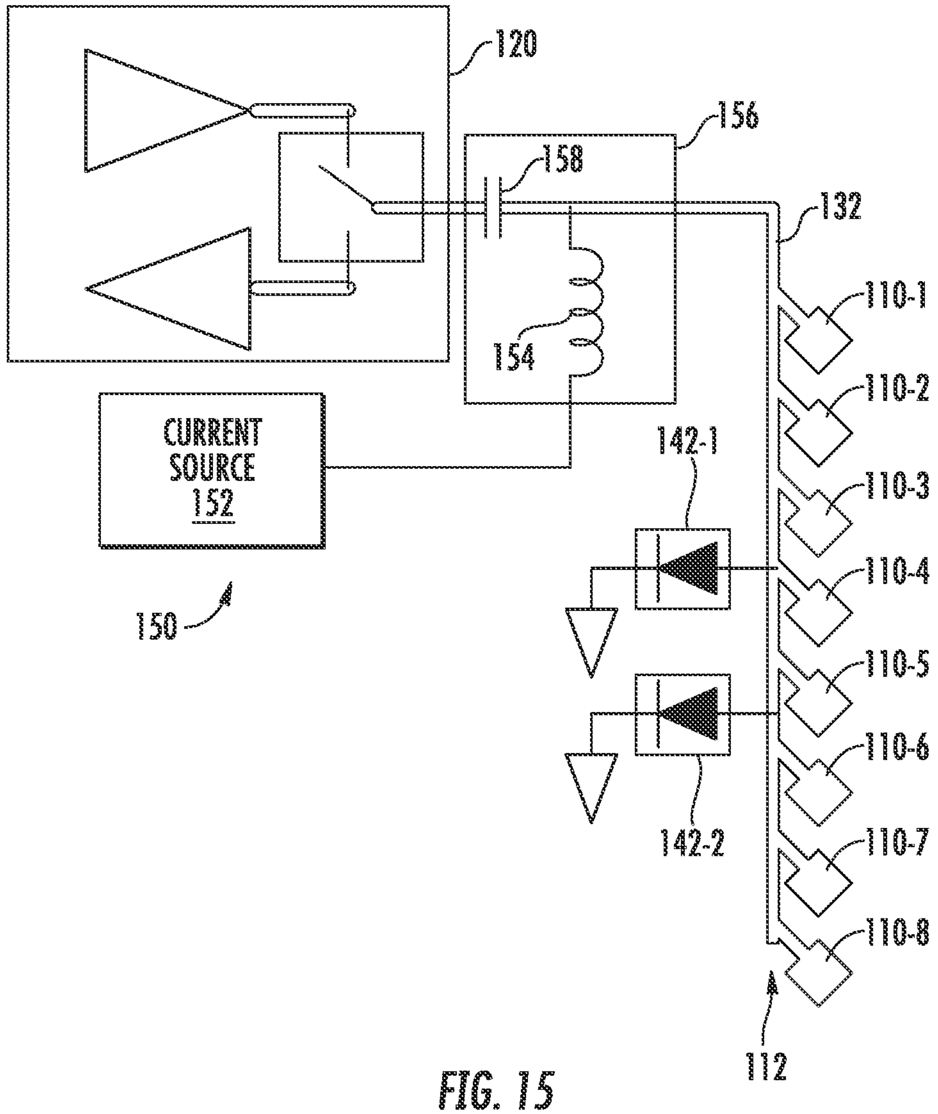
FIG. 15 is a schematic diagram of a column of a phased array antenna according to embodiments of the present invention that illustrates an example implementation of the switch control network.

As shown in FIG. 15, in example embodiments, the switch control network 150 may comprise a shared current source 152 and a bias-T circuit 156 for each column. FIG. 15 only shows the current source 152 and one of the columns 112 of the phased array antenna 100 to simplify the drawing. As shown in FIG. 15, the bias-T circuit includes an inductor 154 and a capacitor 158. The capacitor 158 is coupled to a transceiver 120 and blocks the DC current from the shared DC current source 152 from passing to the transceiver 120. The inductor 154 is coupled between the shared DC current source 152 and the transmission line 132. The PIN diodes 142 may be forward biased by applying a DC current to the inductor path of the bias-T circuit 156 in order to inject the DC current onto the transmission line 132. Both the RF signal from the transceiver 120 and the DC bias current from the DC current source 152 are applied to the radiating elements 110. The bias-T circuit 156 thus allows control of the bias state of the PIN diodes 142 while keeping the DC bias circuit isolated from the RF transceiver 120. It will be appreciated that the switch control network 150 of FIG. 6 may be used in any of the antennas according to embodiments of the present invention described herein.

In some applications it may be advantageous to provide more than two selectable elevation beamwidth states. In this case switches 140 may be placed between respective pairs of adjacent radiating elements 110 and controlled independently in order to excite varying numbers of radiating element 110 to set the elevation beamwidth to three or more different states.

Figure 16:
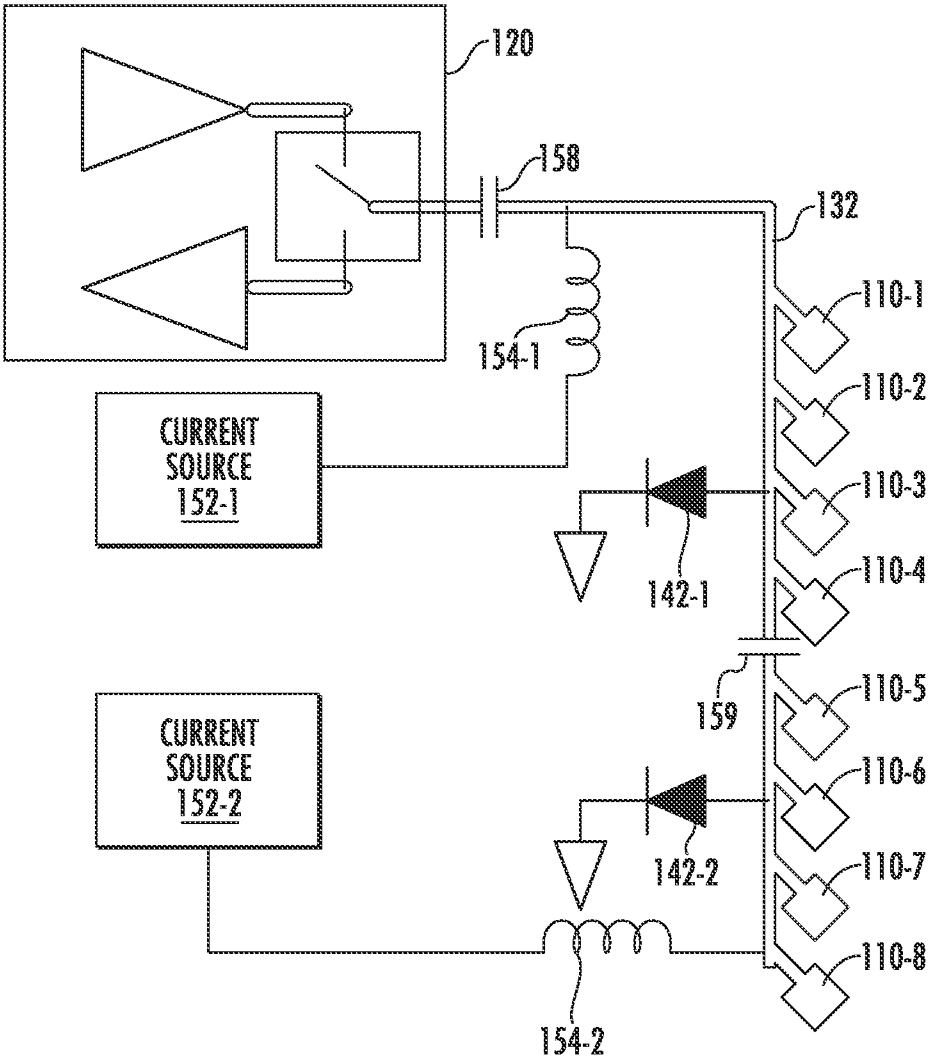
FIG. 16 is a schematic diagram of a column of radiating elements of a phased array antenna according to further embodiments of the present invention that has three selectable elevation beamwidths.

FIG. 16 is a schematic diagram of a column of radiating elements of a phased array antenna according to embodiments of the present invention that has three selectable elevation beamwidths. Referring to FIG. 16, PIN diodes 142-1, 142-2 are placed between radiating elements 110-3 and 110-4 and between radiating elements 110-5 and 110-6, respectively. A first DC bias current may be selectively fed to the first PIN diode 142-1 through a first inductor 154-1. The transceiver 120 is coupled to the transmission line 132 through a capacitor 158 in order to isolate the DC bias current for PIN diode 142-1. A second capacitor 159 is provided to block the DC bias current for PIN diode 142-1 from affecting the bias state of the PIN diode 142-2. PIN diode 142-2 is provided a separate DC bias current through a second inductor 154-2. In this manner both PIN diodes 142-1, 142-2 can be independently biased. In this example, this would allow the phased array antenna to be excited in three states having either three radiating elements 110, five radiating elements 110, or eight radiating elements 110 per column. This would provide capability to select the three elevation beamwidth conditions represented in FIG. 5. This technique can be extended with additional PIN diodes 142 (or other switches 140) and biasing networks by further separating the transmission lines 132 through capacitive couplings to provide a higher number of elevation beamwidth states.

FIG. 6 illustrates an example of a two dimensional antenna array configuration that implements switched beamwidth control in one dimension based on linearly fed array columns. In this example, beam steering in the horizontal or azimuth axis is controlled by application of phase weighting that is applied to each of the eight transceiver channels in order to provide a narrow beamwidth in azimuth with a wide field of view. In the vertical or elevation direction, the switched beamwidth approach is implemented by applying a bias current to the PIN diodes 142 to select the wide elevation beamwidth condition or by applying no bias current or a negative bias voltage to the PIN diodes 142 to select the narrow elevation beamwidth condition.

Although the above examples focus on switching the elevation beamwidth of a phased array antenna, the same technique can be applied in cases in which the horizontal or azimuth pattern must be switched between multiple beamwidth states. In addition, this same technique is also applicable to dual polarization antenna arrays in order to switch the azimuth and elevation beamwidths in tandem.

Thus, pursuant to embodiments of the present invention, phased array antennas are provided that may include a first transceiver (e.g., transceiver 120), a plurality of first radiating elements (e.g., radiating elements 110) that are arranged in a first linear array (e.g., a column 112), a first feed network (e.g., feed network 130) that is electrically interposed between the first radiating elements and the first transceiver, and a first switch (e.g., switch 140/PIN diode 142) that is coupled along the first feed network. A state of the first switch is selectable to adjust a number of the first radiating elements that are electrically connected to the first transceiver. A radiation pattern of the first linear array has a first elevation beamwidth when the first switch is in a first state and has a second, different elevation beamwidth when the first switch is in a second state.

The first switch may comprise, for example, a PIN diode that is coupled between a transmission line segment of the first feed network and a reference voltage. The PIN diode may connect to the transmission line segment at an electrical distance of approximately $[0.25+(n*0.5)]\lambda$ from one of the first radiating elements, where n is an integer having a value of 0 or greater and $\lambda$ is a wavelength corresponding to a center frequency of the frequency band of operation of the phased array antenna. The antenna may include a switch control network (e.g., switch control network 150) that is configured to provide a control signal (e.g., a DC bias current) to the first switch to set the first switch to a desired state.

In some embodiments, a second switch may be coupled along the first feed network. In some cases, the combination of the first and second switches may be used to set the elevation beamwidth of the antenna to at least three different states. In other cases, the second switch may be used to provide enhanced isolation when radiating elements are switched out of the array.

Pursuant to further embodiments of the present invention, methods of operating a phased array antenna that includes at least a first column of radiating elements are provided. One example will now be described with reference to the flow chart diagram of FIG. 17.

Figure 17:
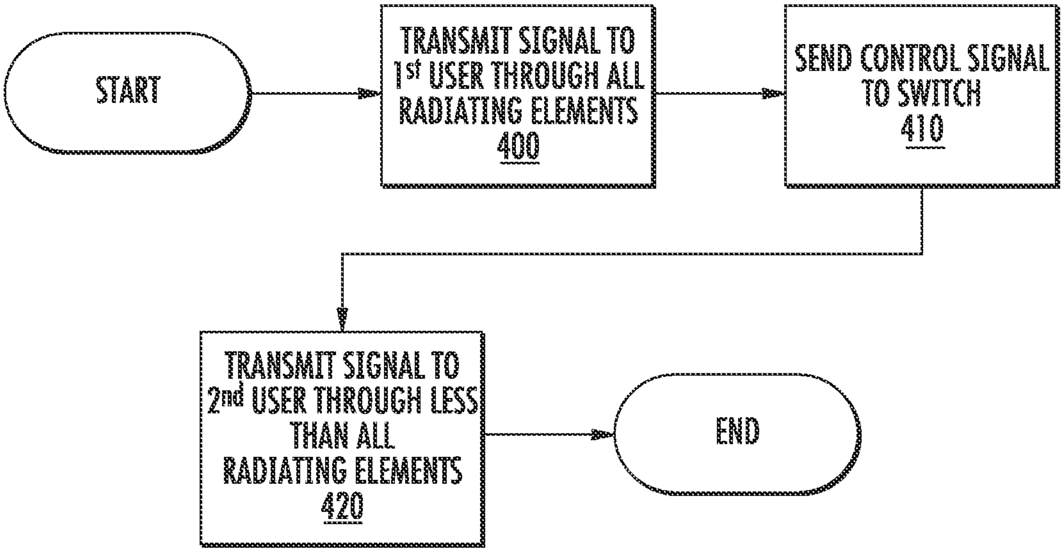
FIG. 17 is a flow chart of a method of operating a phased array antenna according to certain embodiments of the present invention.

Referring to FIG. 17, the method may include transmitting a first RF signal to a first user through all of the radiating elements in the first column of radiating elements (block 400). Then, a control signal (e.g., a DC bias current) may be transmitted to a switch that is provided along the first column of radiating elements (block 410). The switch may be configurable to selectively isolate a second subset of the radiating elements in the first column of radiating elements from a source of the first and second RF signals, and the control signal may be used to change a state of the switch. Thereafter, a second RF signal may be transmitted to a second user through a first subset of the radiating elements in the first column of radiating elements, the first subset including less than all of the radiating elements in the first column of radiating elements (block 420). The first user may be at a first distance from the phased array antenna and the second user may be at a second distance from the phased array antenna that is less than the first distance. While the method described with reference to FIG. 17 describes operation of a phased array antenna having a single column of radiating elements, it will be appreciated that the method of FIG. 17 may also be viewed as describing the operation of one column of radiating elements in antennas according to embodiments of the present invention that include multiple columns of radiating elements.

It will be appreciated that numerous changes may be made to the above-described example embodiments without departing from the scope of the present invention. For example, aspects of all of the above disclosed embodiments may be combined in any way. Thus, for example, any element of the phased array antenna 100 may be used in the other embodiments described herein. As another example, the phased array antennas may have any number of row and columns of radiating elements, and may have any shape. Any appropriate type of switch may be used along each column to change the elevation beamwidth by switching elements into or out of the array. These switches may be located in any appropriate location to switch radiating elements in and out of the array. A switch may be provided for each individual radiating element, or a single switch may be used to switch multiple radiating elements in and out of the array. A wide variety of switch control networks are possible. Thus, it will be appreciated that the above-described embodiments are provided as examples only with the scope of the present invention being defined by the appended claims.

It will also be appreciated that the techniques described herein may be used with passive phased array antennas that use a single radio per polarization. In such passive antenna implementations, the techniques described herein may be used to adjust the elevation beamwidth, the azimuth beamwidth, or both.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A phased array antenna, comprising:
- a first transceiver;
- a plurality of radiating elements;
- a first feed network electrically interposed between the first radiating elements and the first transceiver;
- a first switch that is coupled along the first feed network;
- wherein a state of the first switch is selectable to adjust a number of the first radiating elements that are electrically connected to the first transceiver,
- wherein the first switch is connected to a transmission line segment of the first feed network and is located at an electrical distance of approximately [0.25+(n*0.5)]λ, from a junction where one of the radiating elements connects to the transmission line segment, where n is an integer having a value of 0 or greater and λ, is a wavelength corresponding to a center frequency of the frequency band of operation of the phased array antenna.

2. The phased array antenna of claim 1, wherein the radiating elements are arranged in a first linear array, and wherein a radiation pattern of the first linear array has a first elevation beamwidth when the first switch is in a first state and has a second elevation beamwidth when the first switch is in a second state, the second elevation beamwidth being different than the first elevation beamwidth.

3. The phased array antenna of claim 1, further comprising a switch control network that is configured to provide a control signal to the first switch.

4. The phased array antenna of claim 2, further comprising a second switch that is coupled along the first feed network, wherein the radiation pattern of the first linear array has a third elevation beamwidth when the first switch is in the first state and the second switch is in the first state, the third elevation beamwidth being different than both the first and second elevation beamwidths.

5. The phased array antenna of claim 4, wherein the first switch is provided along the first linear array between a first pair of adjacent radiating elements, and the second switch is provided along the first linear array between a second pair of adjacent radiating elements that includes at least one radiating element that is not part of the first pair of adjacent radiating elements.

6. The phased array antenna of claim 4, wherein both the first switch and the second switch are provided along the first linear array between a first pair of adjacent radiating elements.

7. The phased array antenna of claim 6, wherein the first and second switches are separated by an electrical distance of approximately [0.25+(n*0.5)]λ, where n is an integer having a value of 0 or greater and λ, is a wavelength corresponding to a center frequency of the frequency band of operation of the phased array antenna.

8. The phased array antenna of claim 4, wherein the first switch and the second switch are independently controllable.

9. The phased array antenna of claim 2, wherein the first switch is configurable to selectively isolate a subset of the radiating elements in the first linear array from the transceiver.

10. The phased array antenna of claim 2, further comprising:

a plurality of additional transceivers;

a plurality of additional linear arrays of radiating elements;

a plurality of additional feed networks electrically interposed between the additional linear arrays and respective ones of the additional transceivers;

a plurality of additional switches that are coupled along the respective additional feed networks;

wherein a state of each of the additional switches is selectable to adjust a number of the radiating elements in the respective additional linear arrays that are electrically connected to respective ones of the additional transceivers.

11. The phased array antenna of claim 6, wherein the first and second switches connect to a transmission line of the feed network at the same electrical distance from the first transceiver.

* * * * *